(12) United States Patent
Kohara et al.

(10) Patent No.: US 12,067,971 B2
(45) Date of Patent: Aug. 20, 2024

(54) INFORMATION PROCESSING APPARATUS AND INFORMATION PROCESSING METHOD

(71) Applicant: SONY CORPORATION, Tokyo (JP)

(72) Inventors: Ichitaro Kohara, Tokyo (JP); Tatsuma Sakurai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 483 days.

(21) Appl. No.: 17/250,271

(22) PCT Filed: Jun. 20, 2019

(86) PCT No.: PCT/JP2019/024475
§ 371 (c)(1),
(2) Date: Dec. 23, 2020

(87) PCT Pub. No.: WO2020/004213
PCT Pub. Date: Jan. 2, 2020

(65) Prior Publication Data
US 2021/0264899 A1    Aug. 26, 2021

(30) Foreign Application Priority Data
Jun. 29, 2018    (JP) .................................. 2018-124856

(51) Int. Cl.
*G10L 15/06* (2013.01)
*G10L 15/01* (2013.01)
(Continued)

(52) U.S. Cl.
CPC .............. *G10L 15/06* (2013.01); *G10L 15/01* (2013.01); *G10L 15/22* (2013.01); *G10L 15/32* (2013.01)

(58) Field of Classification Search
CPC ....... G10L 15/22; G10L 15/183; G10L 15/00; G10L 15/26
See application file for complete search history.

(56) References Cited

U.S. PATENT DOCUMENTS 6,757,647 B1    6/2004  Nathan
7,860,873 B2 *  12/2010 Campbell ............... G06F 16/36
                                              707/758
(Continued)

FOREIGN PATENT DOCUMENTS

CN    1416112 A    5/2003
CN    1448915 A    10/2003
(Continued)

OTHER PUBLICATIONS

International Search Report and Written Opinion of PCT Application No. PCT/JP2019/024475, dated Aug. 13, 2019, 12 pages of ISRWO.

(Continued)

*Primary Examiner* — Mark Villena
(74) *Attorney, Agent, or Firm* — CHIP LAW GROUP

(57) ABSTRACT

Provided is an information processing apparatus including a first dictionary that has registered a plurality of utterance expressions, a first voice recognition unit that executes a first voice recognition process using the first dictionary, and a dictionary update unit that updates utterance expressions to be registered to the first dictionary based on usage performance of utterance of a user, in which the dictionary update unit deletes an utterance expression having a low usage performance of utterance from the first dictionary or transfers the utterance expression to a second dictionary that has registered a plurality of utterance expressions not registered in the first dictionary.

18 Claims, 24 Drawing Sheets

(51) Int. Cl.
G10L 15/22 (2006.01)
G10L 15/32 (2013.01)

(56) References Cited

U.S. PATENT DOCUMENTS

| | | |
|---|---|---|
| 2004/0010409 A1 | 1/2004 | Ushida et al. |
| 2007/0027693 A1 | 2/2007 | Hanazawa |
| 2007/0124134 A1* | 5/2007 | Van Kommer ........ G10L 15/197 704/10 |
| 2007/0271097 A1 | 11/2007 | Abe |
| 2008/0154576 A1* | 6/2008 | Wu ........................ G06F 40/129 704/2 |
| 2011/0010174 A1* | 1/2011 | Longe .................... G10L 15/32 704/235 |
| 2012/0179448 A1* | 7/2012 | Gupta ................... H04W 4/029 455/414.1 |
| 2013/0124195 A1* | 5/2013 | Ehsani ................... G06F 40/247 704/9 |
| 2014/0207440 A1* | 7/2014 | Li .......................... G06F 40/242 704/9 |
| 2014/0365880 A1* | 12/2014 | Bellegarda ........ G06F 16/90324 715/261 |
| 2016/0351185 A1* | 12/2016 | Lin ......................... G10L 17/22 |
| 2016/0372115 A1* | 12/2016 | Lüddeke ................ G10L 15/30 |
| 2017/0133015 A1* | 5/2017 | Tomsa ................... G10L 15/26 |
| 2018/0101598 A1* | 4/2018 | Allen .................... G06F 40/268 |
| 2018/0122365 A1 | 5/2018 | Kunitake |
| 2018/0122366 A1* | 5/2018 | Nishikawa .............. G10L 15/26 |
| 2019/0027130 A1 | 1/2019 | Tsunoo et al. |
| 2019/0378501 A1* | 12/2019 | Mithra ................... G10L 25/78 |

FOREIGN PATENT DOCUMENTS

| | | |
|---|---|---|
| CN | 1905007 A | 1/2007 |
| CN | 101002455 A | 7/2007 |
| CN | 105224664 A | 1/2016 |
| CN | 107679037 A | 2/2018 |
| EP | 3428917 A1 | 1/2019 |
| JP | 63-186299 A | 8/1988 |
| JP | H06167992 A | 6/1994 |
| JP | H08254990 A | 10/1996 |
| JP | 2003-295893 A | 10/2003 |
| JP | 2007-033901 A | 2/2007 |
| JP | 2007-163895 A | 6/2007 |
| JP | 2010237286 A | 10/2010 |
| JP | 2011-248360 A | 12/2011 |
| JP | 2013178384 A | 9/2013 |
| JP | 2014-048507 A | 3/2014 |
| JP | 2014-178380 A | 9/2014 |
| JP | 2018-031985 A | 3/2018 |
| WO | 2012073275 A1 | 6/2012 |
| WO | 2017/154282 A1 | 9/2017 |

OTHER PUBLICATIONS

"China Excellence Masters' Theses Full-Text Database, Information Technology Edition (Month)", No. 2 Feb. 15, 2013 Zhu Mingqiang, Investigations on word recognition for forum corpuses based on dictionary and word frequency analysis.

"Method of Special Domain Lexicon Construction Based on Raw Materials," Mini-Micro Systems, vol. 26, No. 6, Jun. 21, 2005, pp. 1088-1092.

Notification of the First Office Action for Chinese Patent Application No. 2019800420460, dated Oct. 26, 2023, 24 pages, including translation.

* cited by examiner

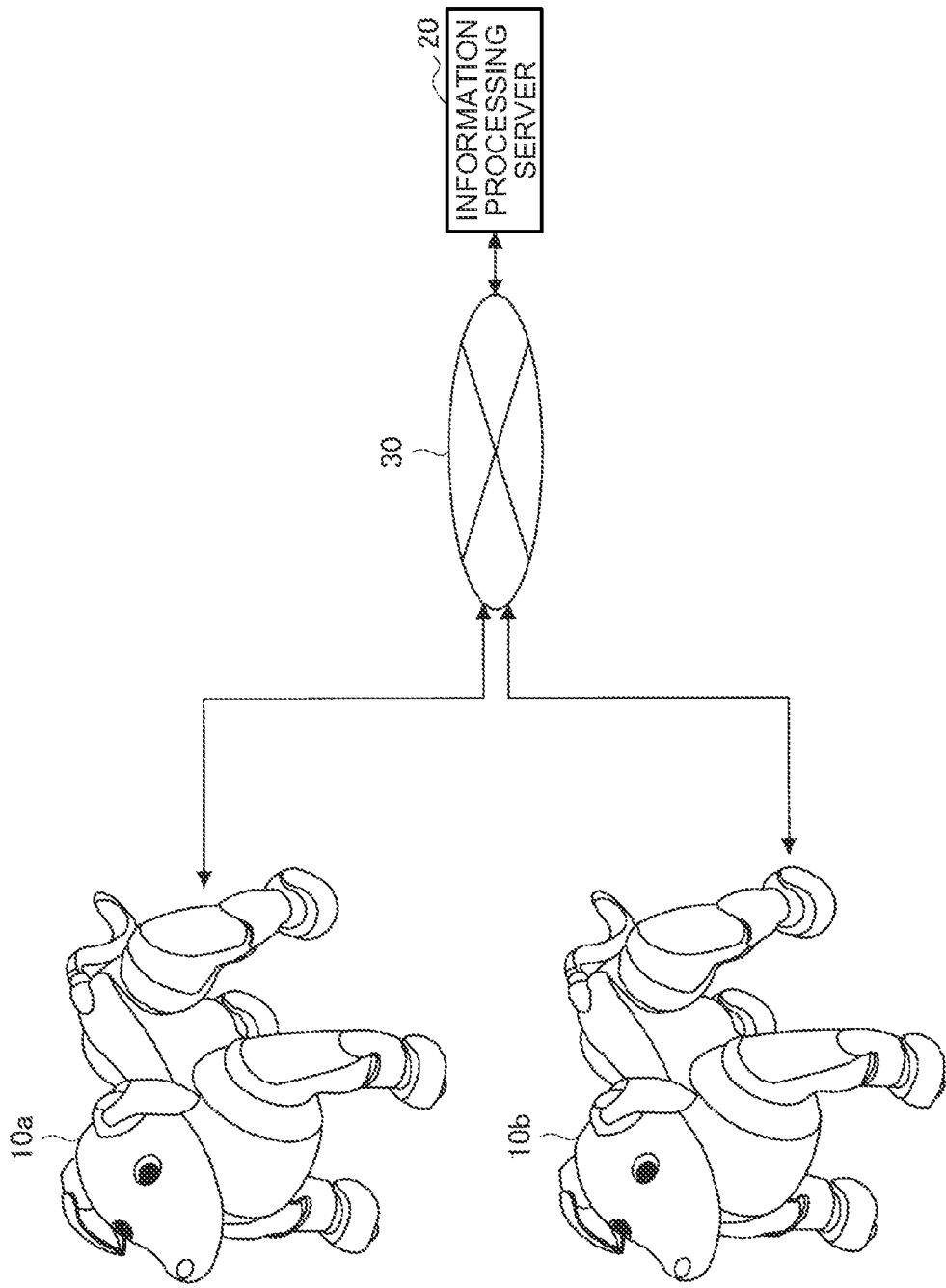

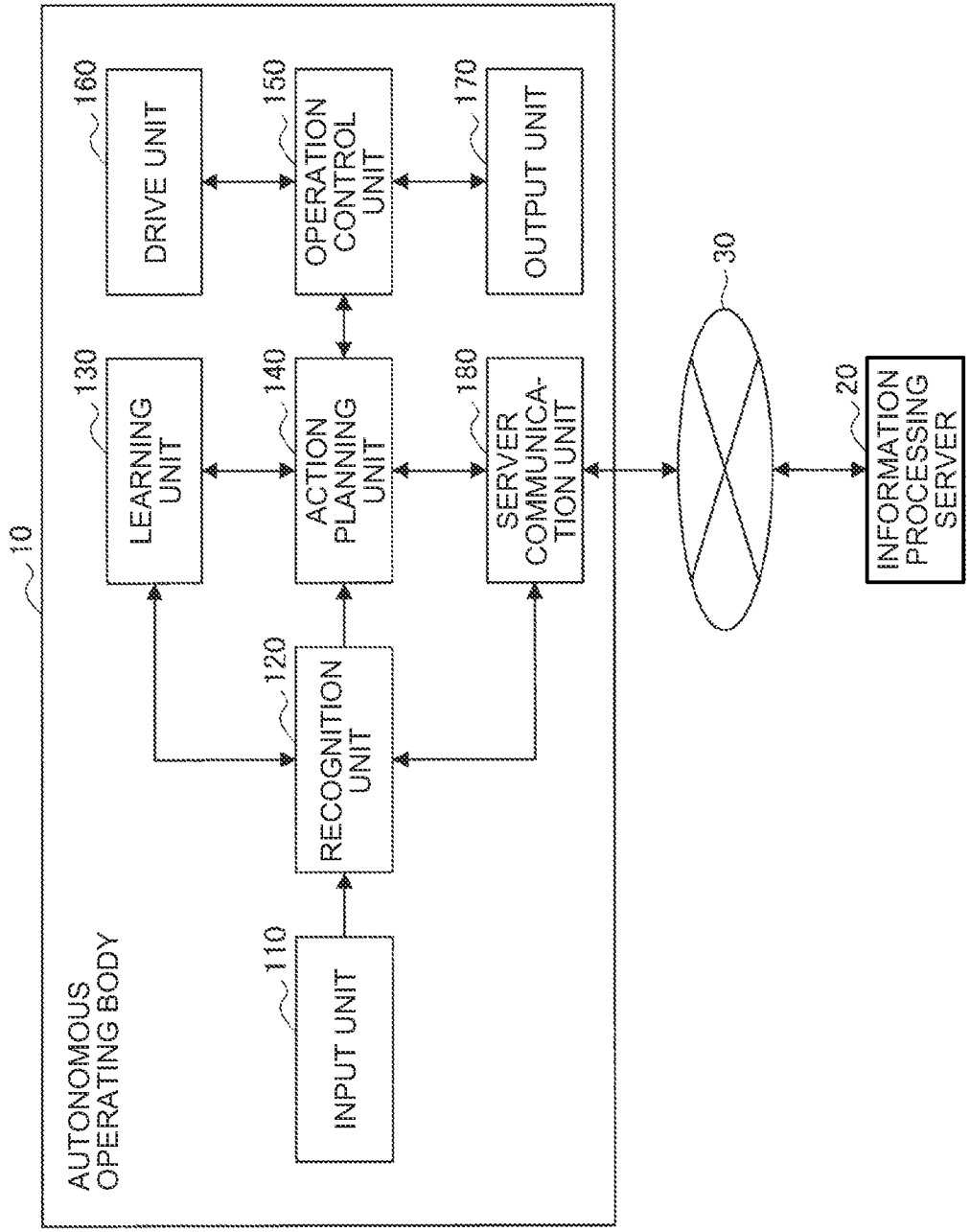

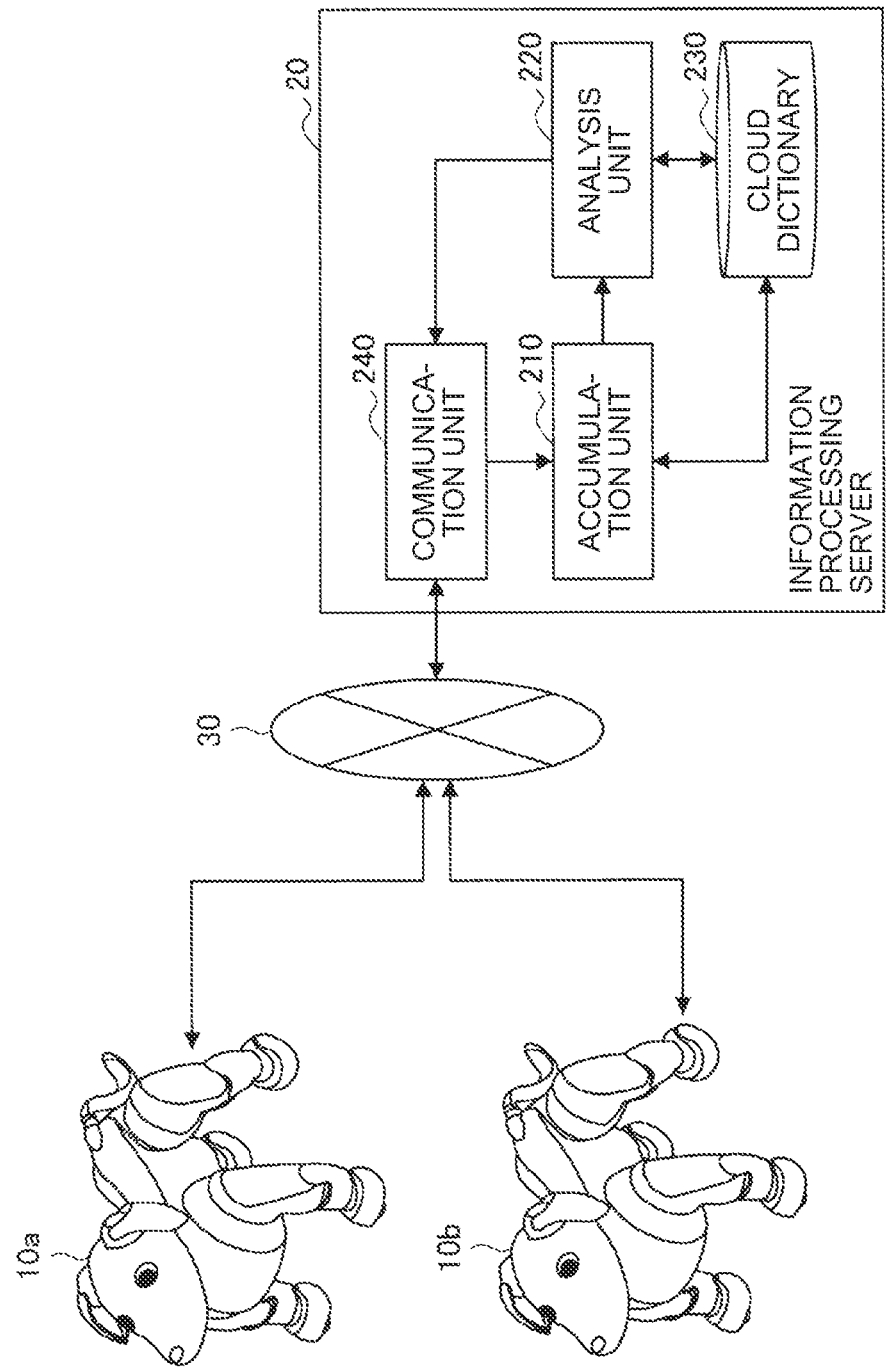

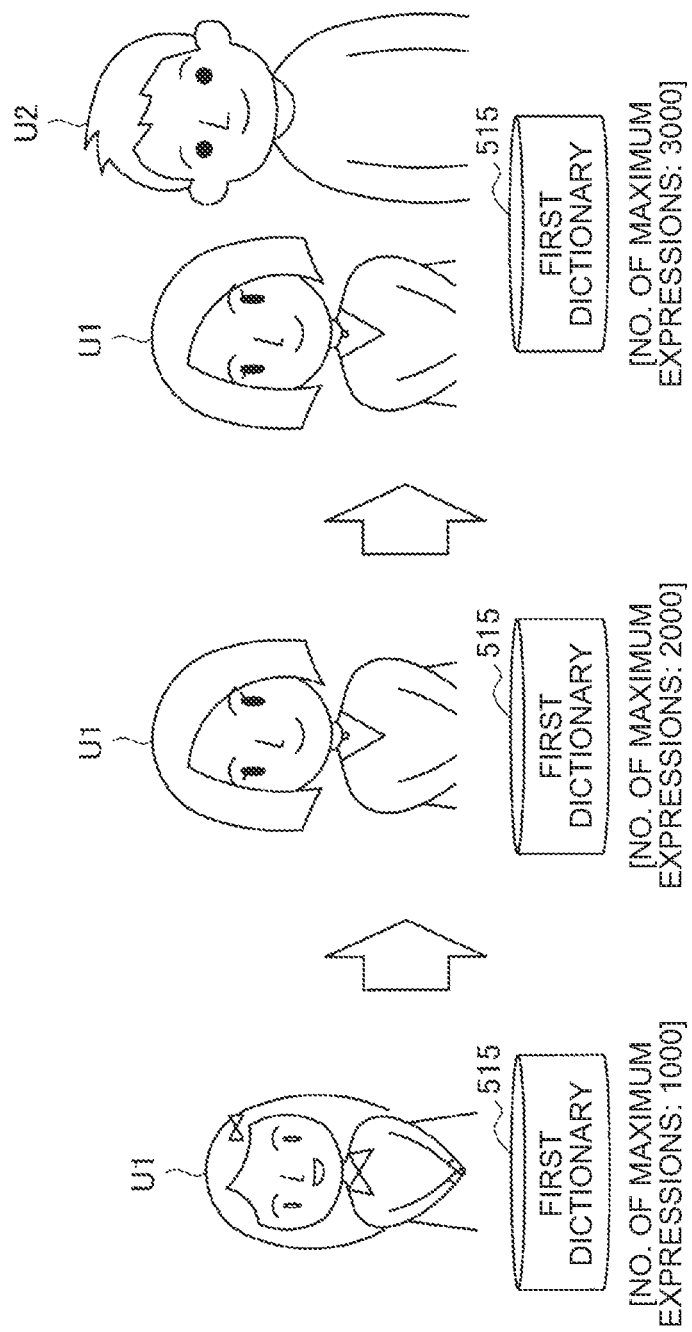

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/024475 filed on Jun. 20, 2019, which claims priority benefit of Japanese Patent Application No. JP 2018-124856 filed in the Japan Patent Office on Jun. 29, 2018. Each of the above-referenced applications is hereby incorporated herein by reference in its entirety.

FIELD

The present disclosure relates to an information processing apparatus, an information processing method, and a program.

BACKGROUND

In recent years, various devices using voice recognition technologies have been developed. In addition, many methods for improving voice recognition accuracy have been proposed. For example, Patent Literature 1 discloses a technique of improving the robustness of a context-dependent voice recognition device against environmental changes.

CITATION LIST

Patent Literature

Patent Literature 1: JP 2011-248360 A

SUMMARY

Technical Problem

In typical voice recognition processes, in order to ensure the real-time processing performance in the response, suppressing the computation amount related to the process is required. In addition, there is a trade-off between reduction of the computation amount and improvement of recognition accuracy.

Therefore, the present disclosure proposes a novel and enhanced information processing apparatus, information processing method, and program capable of improving the voice recognition accuracy while suppressing the computation amount.

Solution to Problem

According to the present disclosure, an information processing apparatus is provided. The information processing apparatus includes a first dictionary that has registered a plurality of utterance expressions, a first voice recognition unit that executes a first voice recognition process using the first dictionary, and a dictionary update unit that updates utterance expressions to be registered to the first dictionary based on usage performance of utterance of a user, wherein the dictionary update unit deletes an utterance expression having a low usage performance of utterance from the first dictionary or transfers the utterance expression to a second dictionary that has registered a plurality of utterance expressions not registered in the first dictionary.

Moreover, according to the present disclosure, an information processing method by a processor is provided. The information processing method includes executing a first voice recognition process using a first dictionary that has registered a plurality of utterance expressions, and updating utterance expressions to be registered to the first dictionary based on a usage performance of utterance of a user, wherein the updating further includes deleting an utterance expression having a low usage performance of utterance from the first dictionary, or transferring the utterance expression to a second dictionary that has registered a plurality of utterance expressions not registered in the first dictionary.

Moreover, according to the present disclosure, a program is provided. The program causes a computer to function as an information processing apparatus including a first dictionary that has registered a plurality of utterance expressions, a first voice recognition unit that executes a first voice recognition process using the first dictionary, and a dictionary update unit that updates utterance expressions to be registered to the first dictionary based on usage performance of utterance of a user, wherein the dictionary update unit deletes an utterance expression having a low usage performance of utterance from the first dictionary or transfers the utterance expression to a second dictionary that has registered a plurality of utterance expressions not registered in the first dictionary.

Advantageous Effects of Invention

According to the present disclosure, it is possible to improve the voice recognition accuracy while suppressing the computation amount.

Note that the above effect is not necessarily limited, and any of effects described in the present specification or other effects that can be understood from the present specification together with or in place of the above effects may be provided.

BRIEF DESCRIPTION OF DRAWINGS

FIG. 11 is a diagram illustrating an example of a system configuration according to the embodiment.

FIG. 12 is a diagram illustrating a functional configuration example of an autonomous operating body according to the embodiment.

FIG. 14 is a diagram illustrating a functional configuration example of an information processing server according to the embodiment.

FIG. 22 is a diagram illustrating a dynamic change in the maximum number of registered utterance expressions according to the embodiment.

DESCRIPTION OF EMBODIMENTS

Figure 1:
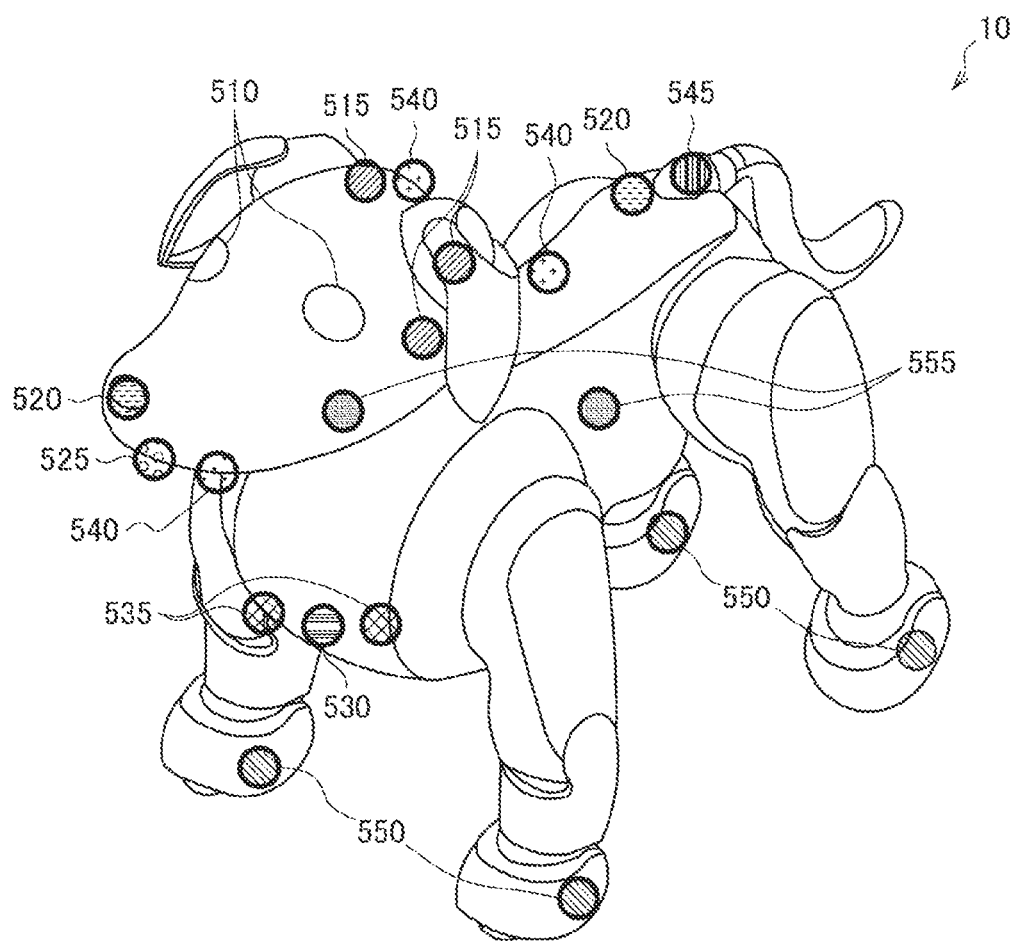
FIG. 1 is a diagram illustrating a hardware configuration example of an autonomous operating body according to an embodiment of the present disclosure.

Hereinafter, preferred embodiments of the present disclosure will be described in detail with reference to the accompanying drawings. In the present specification and the drawings, components having substantially the same functional configuration will be denoted with the same reference numerals and redundant description will be omitted.

Note that the description will be provided in the following order.
 1. Configuration
 1.1. Overview of autonomous operating body 10
 1.2. Hardware configuration example of autonomous operating body 10
 1.3. System Configuration example
 1.4. Functional configuration example of autonomous operating body 10
 1.5. Functional configuration example of information processing server 20
 2. Functional details
 3. Summary <1. Configuration>
<<1.1. Overview of Autonomous Operating Body 10>>

In recent years, various devices have been developed to recognize a user's utterance or the like and execute an operation based on the recognition result. Examples of the above-described devices include a voice agent device that provides various functions through voice dialogue with a user, and an autonomous operating body that changes its behavior in accordance with the recognized user's utterance and surrounding environment.

As described above, in typical voice recognition processes, in order to ensure the real-time processing performance in the response, suppressing the computation amount related to the processing is required. In particular, in the case of an autonomous operating body formed in imitation of a creature such as a human or an animal, the speed of response to the user's utterance is important, and accordingly, it is desirable to suppress the computation amount as much as possible.

On the other hand, in a voice recognition process, there is a trade-off between reduction of the computation amount and improvement of recognition accuracy. Therefore, it is important to have a mechanism to ensure recognition accuracy that would not impair the user experience while suppressing the computation amount.

Here, in order to improve the recognition accuracy while suppressing the computation amount related to the voice recognition process, it is conceivable to use a method of suppressing the number of recognizable utterance expressions. Specifically, by limiting the recognizable utterance expressions to the utterance expressions frequently used by the user, it would be possible to improve the recognition accuracy while reducing the search path to effectively reduce the computation amount.

In particular, when performing the voice recognition process on the local side, the above method would be effective because the computational resources are finite.

However, at this time, in a case where there is a discrepancy between a limited utterance expression set and an utterance expression set actually used by the user, there is a concern of deterioration of recognition accuracy, leading to impairment of user's experience. For example, applying an infant utterance expression set to an elderly user, or applying a northern-region language utterance expression set to a user who is a western-region language speaker, might significantly deteriorate the recognition accuracy.

An information processing apparatus, an information processing method, and a program according to an embodiment of the present disclosure are conceived in view of the above circumstances, and are intended to improve the voice recognition accuracy while suppressing the computation amount by dynamically updating the above-described utterance expression set based on usage performance of utterance of a user.

Here, an outline of an autonomous operating body 10 according to an embodiment of the present disclosure will be described first. The autonomous operating body 10 according to an embodiment of the present disclosure is an information processing apparatus that estimates a situation based on collected sensor information and a user's voice, and autonomously selects and executes various operations according to the situation. One of the characteristic of the autonomous operating body 10 is that it autonomously executes an operation presumed to be optimal for each of situations, unlike a robot that simply performs an operation according to a user's instruction command.

At this time, the autonomous operating body 10 according to an embodiment of the present disclosure executes a voice recognition process related to a user's utterance on the local side, and performs an autonomous operation based on a result of the voice recognition process and the recognized surrounding environment.

In this manner, the autonomous operating body 10 according to an embodiment of the present disclosure determines and executes the autonomous operation by comprehensively judging its own state, the surrounding environment, or the like, similarly to the case of animals including humans. In the above points, the autonomous operating body 10 according to an embodiment of the present disclosure is clearly different from a passive device that follows an instruction and executes a corresponding operation or process.

Hereinafter, a case where an information processing apparatus according to an embodiment of the present disclosure is an autonomous mobile robot that performs autonomous posture control in space and executes various operations will be described as a main example. The autonomous operating body 10 may be an autonomous mobile robot having a shape in imitation of an animal such as a human or a dog and having a moving capability. In addition, the information processing apparatus according to an embodiment of the present disclosure may be an agent device or a smartphone, for example. The technical idea according to the present disclosure can be applied to various devices that perform processes based on voice recognition process.

<<1.2. Hardware Configuration Example of Autonomous Operating Body 10>>

Next, a hardware configuration example of the autonomous operating body 10 according to an embodiment of the present disclosure will be described. In the following, an exemplary case where the autonomous operating body 10 is a dog-shaped quadruped walking robot will be described.

FIG. 1 is a diagram illustrating a hardware configuration example of the autonomous operating body 10 according to an embodiment of the present disclosure. As illustrated in FIG. 1, the autonomous operating body 10 is a dog-shaped quadruped walking robot having a head, a body, four legs, and a tail. Furthermore, the autonomous operating body 10 includes two displays 510 on the head.

The autonomous operating body 10 further includes various sensors. The autonomous operating body 10 includes, for example, a microphone 515, a camera 520, a time of flight (ToF) sensor 525, a motion sensor 530, a distance sensor 535, a touch sensor 540, an illuminance sensor 545, a sole button 550, and an inertial sensor 555.

(Microphone 515)

The microphone 515 has a function of collecting ambient sounds. The above-described sounds include user's utterances and surrounding environmental sounds, for example. The autonomous operating body 10 may include four microphones on the head, for example. Having a plurality of microphones 515, it is possible to collect sounds generated in the surroundings with high sensitivity and to achieve localization of a sound source.

(Camera 520)

The camera 520 has a function of imaging the user and the surrounding environment. The autonomous operating body 10 may be provided with, for example, two wide-angle cameras at the tip of the nose and the waist. In this case, the wide-angle camera placed at the tip of the nose captures an image corresponding to the front field of view of the autonomous operating body (that is, the dog's field of view), while the wide-angle camera at the waist captures an image of the surrounding area centered on the upper side. For example, the autonomous operating body 10 can extract feature points of the ceiling based on images captured by the wide-angle camera worn on the waist so as to implement simultaneous localization and mapping (SLAM).

(ToF Sensor 525)

The ToF sensor 525 has a function of detecting the distance to an object existing in front of the head. The ToF sensor 525 is provided at the tip of the nose of the head. With the ToF sensor 525, it is possible to detect distances to various objects with high accuracy, leading to achievement of operation corresponding to a relative position with an object including a user, an obstacle, or the like.

(Motion Sensor 530)

The motion sensor 530 has a function of detecting the location of a user or a pet living with the user. The motion sensor 530 is set on the chest, for example. The motion sensor 530 can detect an animal object existing in front, making it possible to express various actions toward the animal object, for example, actions corresponding to emotions such as interest, fear, and surprise.

(Distance Sensor 535)

The distance sensor 535 has a function of acquiring the conditions of the front floor surface of the autonomous operating body 10. The distance sensor 535 is disposed on the chest, for example. With the distance sensor 535, the distance between the autonomous operating body 10 and an object existing on the front floor surface can be detected with high accuracy, leading to achievement of operation corresponding to the relative position with the object.

(Touch Sensor 540)

The touch sensor 540 has a function of detecting contact by the user. The touch sensor 540 is disposed at a portion on the autonomous operating body 10 where the user is likely to touch, such as the top of the head, under the chin, or the back. The touch sensor 540 may be a capacitance type or pressure sensitive type touch sensor, for example. With the touch sensor 540, it is possible to detect a contact action such as touching, stroking, hitting, or pushing made by the user, leading to achievement of a reaction to the contact action.

(Illuminance Sensor 545)

The illuminance sensor 545 detects the illuminance in the space where the autonomous operating body 10 is located. The illuminance sensor 545 may be disposed at the base of the tail on the back surface of the head, for example. With the illuminance sensor 545, it is possible to detect the brightness of the surroundings and execute an action corresponding to the brightness.

(Sole Button 550)

The sole button 550 has a function of detecting whether or not the bottom surface of the leg of the autonomous operating body 10 is in contact with the floor. For this purpose, the sole button 550 is arranged at each of the parts corresponding to the paws of the four legs. By using the sole button 550, it is possible to detect contact or non-contact between the autonomous operating body 10 and the floor surface, and possible to grasp a state that the autonomous operating body 10 is lifted by the user.

(Inertial Sensor 555)

The inertial sensor 555 is a 6-axis sensor that detects physical quantities such as speed, acceleration, and rotation of the head and body. That is, the inertial sensor 555 detects acceleration and angular velocity on the X-axis, Y-axis, and Z-axis. Inertial sensors 555 are located on individual positions on the head and body. With the inertial sensor 555, it is possible to detect the movements of the head and body of the autonomous operating body 10 with high accuracy and achieve the movement control corresponding to the situation.

An example of the sensors included in the autonomous operating body 10 according to an embodiment of the present disclosure has been described as above. The above configuration described with reference to FIG. 1 is merely an example, and the configuration of the sensors that can be included in the autonomous operating body 10 is not limited to such an example. In addition to the above configuration, the autonomous operating body 10 may further include a temperature sensor, a geomagnetic sensor, and various communication devices including a global navigation satellite system (GNSS) signal receiver. The configuration of the sensors included in the autonomous operating body 10 can be flexibly modified according to specifications and operations.

Figure 2:
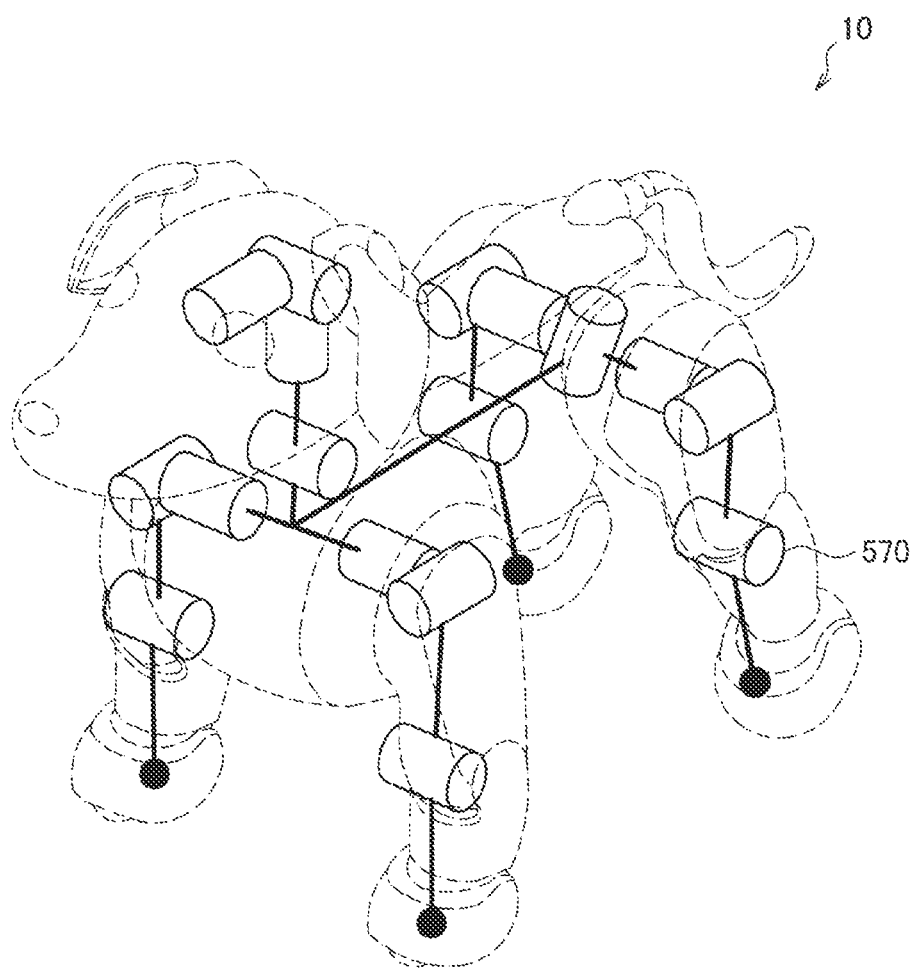
FIG. 2 is a diagram illustrating a configuration example of an actuator included in an autonomous operating body according to the embodiment.

Subsequently, a configuration example of joints of the autonomous operating body 10 according to an embodiment of the present disclosure will be described. FIG. 2 is a configuration example of an actuator 570 included in the autonomous operating body 10 according to an embodiment of the present disclosure. The autonomous operating body 10 according to an embodiment of the present disclosure has a total of 22 rotational degrees of freedom, specifically, two at the ears, two at the tail, and one at the mouth, in addition to the rotation points illustrated in FIG. 2.

For example, the autonomous operating body 10 has three degrees of freedom in the head, making it possible to perform nodding and tilting motions at the same time. In addition, the autonomous operating body 10 can reproduce the swing motion of the waist by the actuator 570 provided on the waist, making it possible to achieve reproduction of natural and flexible motions closer to those of a real dog.

The autonomous operating body 10 according to an embodiment of the present disclosure may actualize the above 22 rotational degrees of freedom by combining 1-axis actuators and 2-axis actuators. For example, 1-axis actuators may be adopted for the elbows and knees of the leg, and 2-axis actuators may be adopted for the shoulders and the bases of the thighs.

Figure 3:
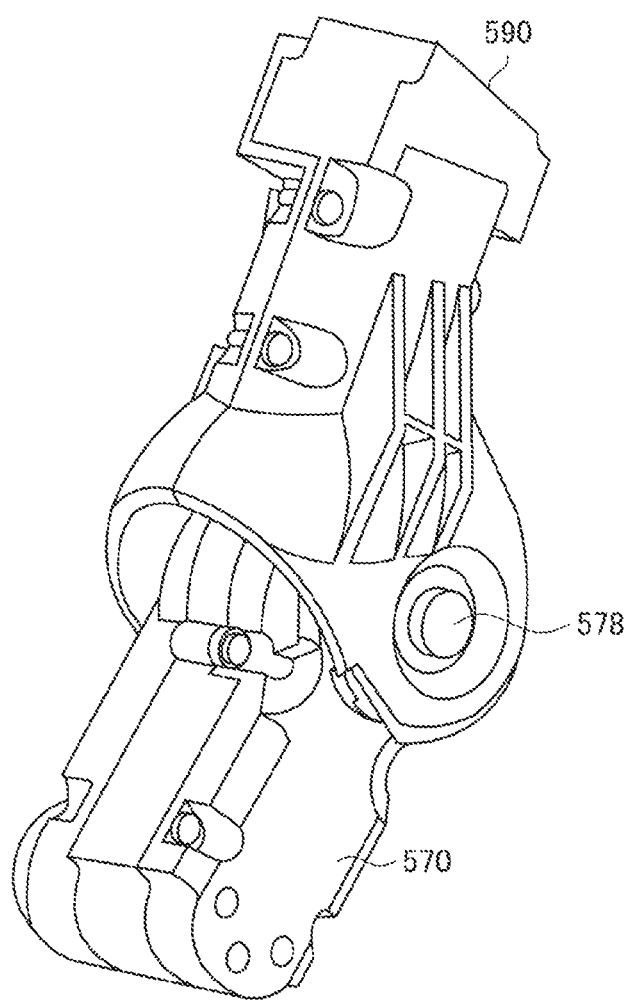
FIG. 3 is a diagram illustrating operation of the actuator included in the autonomous operating body according to the embodiment.
Figure 4:
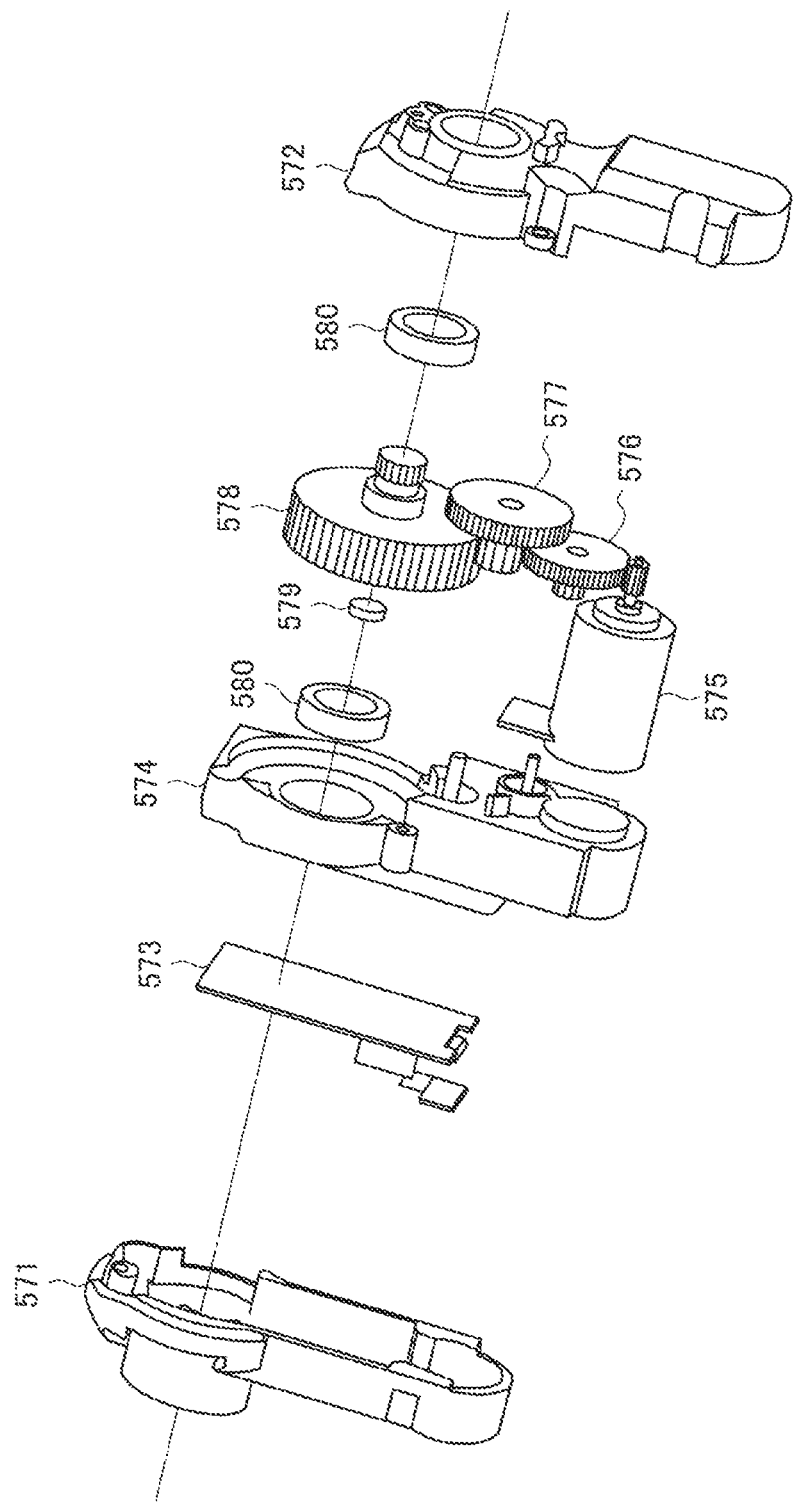
FIG. 4 is a diagram illustrating operation of the actuator included in the autonomous operating body according to the embodiment.

FIGS. 3 and 4 are diagrams illustrating the operation of the actuator 570 included in the autonomous operating body 10 according to an embodiment of the present disclosure. Referring to FIG. 3, the actuator 570 rotates an output gear using a motor 575, enabling driving of a movable arm 590 at an arbitrary rotational position and rotation speed.

Referring to FIG. 4, the actuator 570 according to an embodiment of the present disclosure includes a rear cover 571, a gear BOX cover 572, a control board 573, a gear BOX base 574, a motor 575, a first gear 576, a second gear 577, an output gear 578, a detection magnet 579, and two bearings 580.

The actuator 570 according to an embodiment of the present disclosure may use a magnetic spin-valve giant magnetoresistive (svGMR) member. The control board 573 rotates the motor 575 under the control of the main processor, enabling power to be transmitted to the output gear 578 via the first gear 576 and the second gear 577 to drive the movable arm 590.

Furthermore, the position sensor provided on the control board 573 detects the rotation angle of the detection magnet 579 that rotates in synchronization with the output gear 578, that is, the rotational position of the movable arm 590 to be detected with high accuracy.

Since the magnetic svGMR member is capable of non-contact operation, leading to advantageous effects of excellent durability, and a less impact of signal fluctuations due to distance fluctuations of the detection magnet 579 and the position sensor when used in GMR saturation regions.

The configuration example of the actuator 570 included in the autonomous operating body 10 according to an embodiment of the present disclosure has been described as above. Having the above configuration, it is possible to control the bending and stretching motion of the joint included in the autonomous operating body 10 with high accuracy, and to correctly detect the rotational position of the joint.

Figure 5:
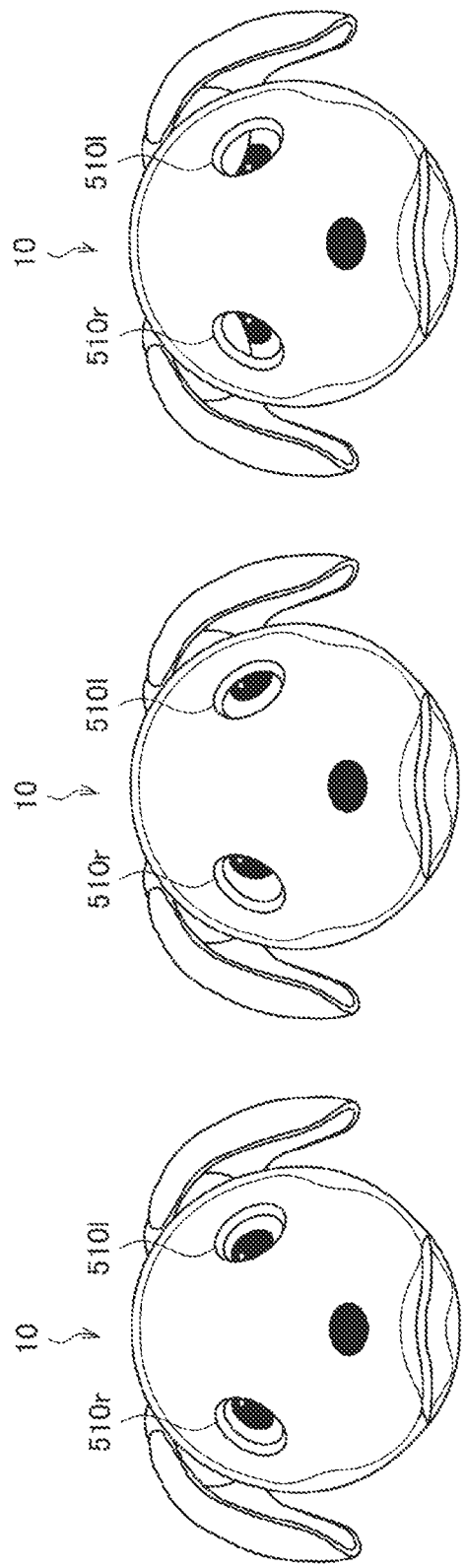
FIG. 5 is a diagram illustrating a function of a display included in an autonomous operating body according to the embodiment.

Subsequently, functions of the display 510 included in the autonomous operating body 10 according to an embodiment of the present disclosure will be described with reference to FIG. 5. FIG. 5 is a diagram illustrating functions of the display 510 included in the autonomous operating body 10 according to an embodiment of the present disclosure.

(Display 510)

The display 510 has a function of visually expressing eye movements and emotions of the autonomous operating body 10. As illustrated in FIG. 5, the display 510 can express the movements of the eyeball, the pupil, and the eyelids according to emotions and movements. The display 510 intentionally suppresses display of texts, symbols, or images unrelated to eyeball movements, thereby producing natural movements similar to those of real animals such as dogs.

Furthermore, as illustrated in FIG. 5, the autonomous operating body 10 includes two displays 510r and 510l corresponding to the right eye and the left eye, respectively. The displays 510r and 510l are actualized by two independent organic light emitting diodes (OLED). The use of OLEDs makes it possible to reproduce the curved surfaces of the eyeballs, enabling a more natural exterior compared with a case of expressing a pair of eyeballs with one flat display or a case of expressing two eyeballs with two independent flat displays.

As described above, the use of the displays 510r and 510l makes it possible to perform high accuracy and flexible expression of the line of sight and emotions of the autonomous operating body 10 as illustrated in FIG. 5. In addition, the user can intuitively grasp the state of the autonomous operating body 10 from the movement of the eyeballs displayed on the display 510.

Figure 6:
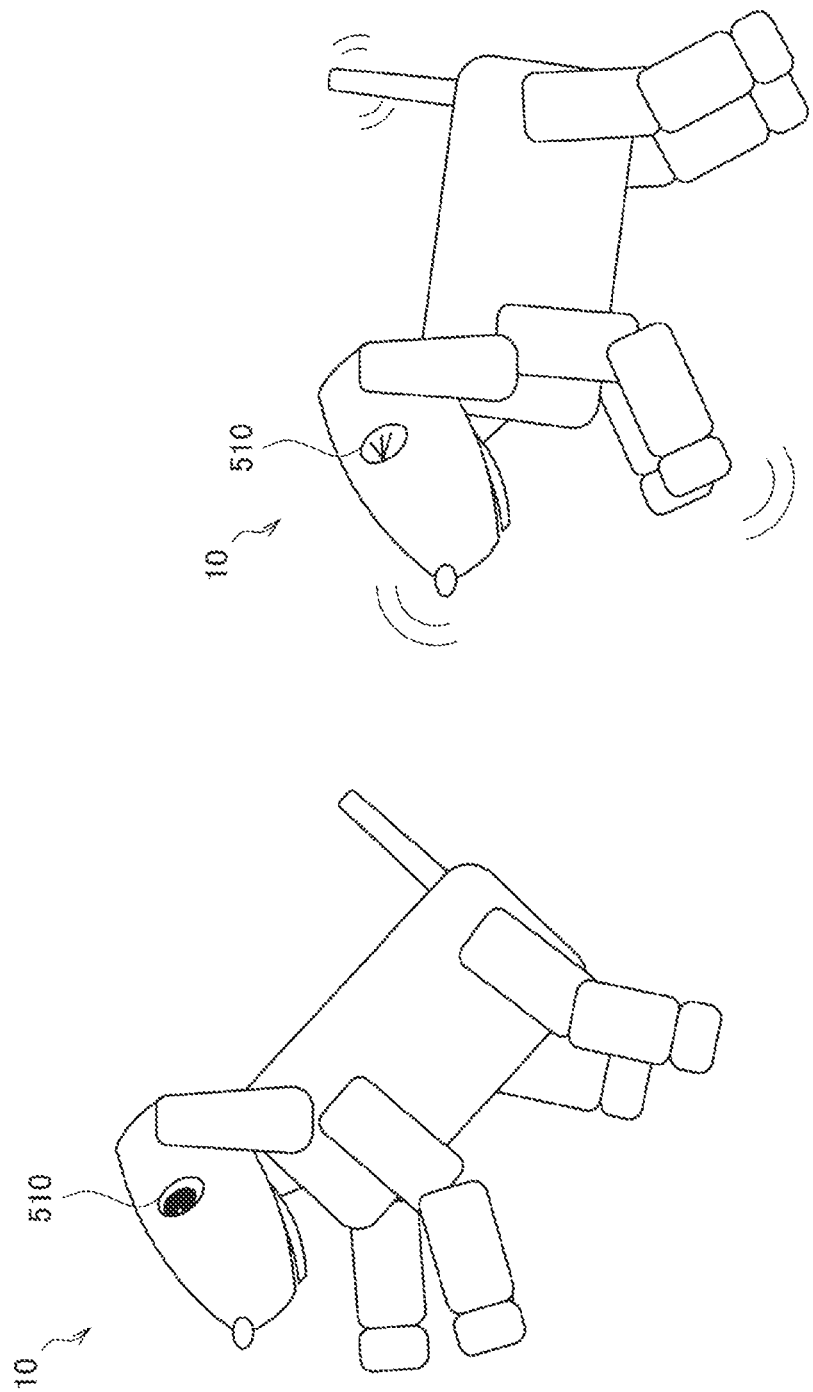
FIG. 6 is a diagram illustrating an operation example of an autonomous operating body according to the embodiment.

The hardware configuration example of the autonomous operating body 10 according to an embodiment of the present disclosure has been described as above. With the above configuration, as illustrated in FIG. 6, by controlling the movements of the joints and eyeballs of the autonomous operating body 10 with high accuracy and flexibility, it is possible to actualize movements and emotional expressions closer to those of a real creature. Note that although FIG. 6 is a diagram illustrating an operation example of the autonomous operating body 10 according to an embodiment of the present disclosure, FIG. 6 simplifies illustration of external structures of the autonomous operating body 10 in order to focus on the movements of the joints and the eyeballs of the autonomous operating body 10. Similarly, the following description will also simplify the external structure of the autonomous operating body 10 in some cases. However, the hardware configuration and exterior of the autonomous operating body 10 according to an embodiment of the present disclosure are not limited to the example as illustrated by drawing and can be appropriately designed.

Furthermore, the autonomous operating body 10 according to an embodiment of the present disclosure can realize interaction with other objects like a real creature by performing the above control. Examples of the above-described objects include other robot devices, home appliances, toys, or the like.

For example, the autonomous operating body 10 according to an embodiment of the present disclosure can recognize a toy existing in the surroundings and perform autonomous operation using the toy, that is, "play" with toys, even without any explicit instruction from the user.

Figure 7A:
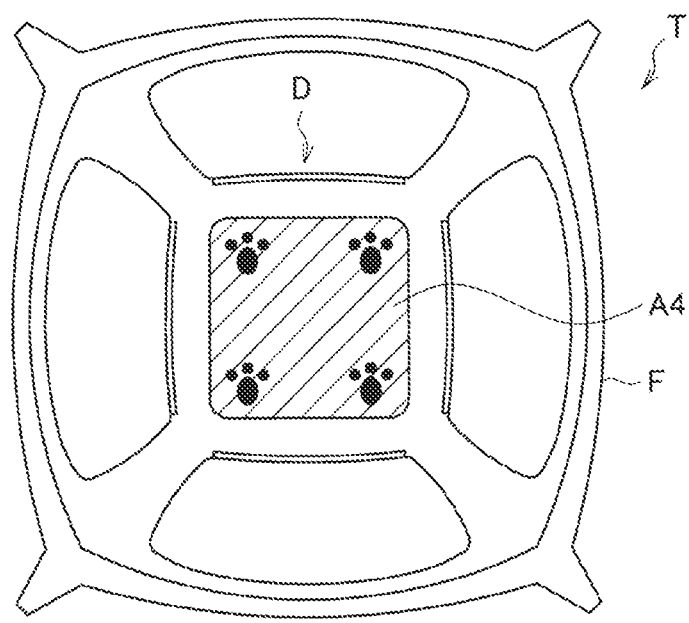
FIG. 7A is a diagram illustrating an example of a dice-shaped toy according to the embodiment.
Figure 7B:
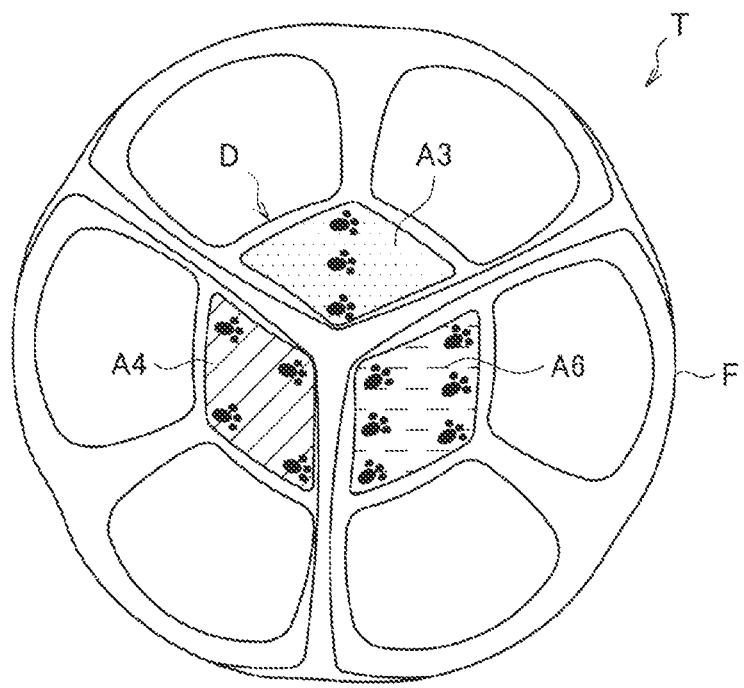
FIG. 7B is a diagram illustrating an example of a dice-shaped toy according to the embodiment.

Examples of the above toys conceivably include ball-shaped, bone-shaped, or dice-shaped toys. FIGS. 7A and 7B are diagrams illustrating an example of a dice-shaped toy according to an embodiment of the present disclosure.

As illustrated in FIGS. 7A and 7B, a dice-shaped toy T according to an embodiment of the present disclosure may have an outer member F formed of an elastomer having a hardness of about 60 to 80, and a dice portion D having a plurality of surfaces A1 to AN of the outer member. The plurality of surfaces A1 to AN correspond to the dice rolls (numbers, or the like), and the number of the surfaces is not limited to the six surfaces as illustrated in FIGS. 7A and 7B.

The autonomous operating body 10 according to an embodiment of the present disclosure can recognize the shape of the outer member F and a predetermined color given to the outer member F and thereby can identify the dice-shaped toy T. The autonomous operating body 10 according to an embodiment of the present disclosure is capable of making various actions such as holding, lifting while holding, throwing (rolling), hooking on the forefoot, and rolling on the forefoot onto the recognized dice-shaped toy T. The outer member F may have a curved shape in part to facilitate the above operation by the autonomous operating body 10.

For this reason, the dice-shaped toy T according to an embodiment of the present disclosure can be, for example, of a size and weight (for example, about 35 g) such that the autonomous operating body 10 can be lifted by adding the outer member F. The size and weight of the dice-shaped toy T can be appropriately designed according to the size and components of the autonomous operating body 10.

Furthermore, the autonomous operating body 10 according to an embodiment of the present disclosure can recognize each of the plurality of surfaces A1 to AN of the dice portion D and can thereby present, to a user, a number (or a pattern or the like) designated by the user.

Furthermore, in the presence of a plurality of dice-shaped toys T, the autonomous operating body 10 according to an embodiment of the present disclosure may execute an operation of stacking the plurality of dice-shaped toys T in the vertical direction autonomously or based on user's instruction.

Figure 8:
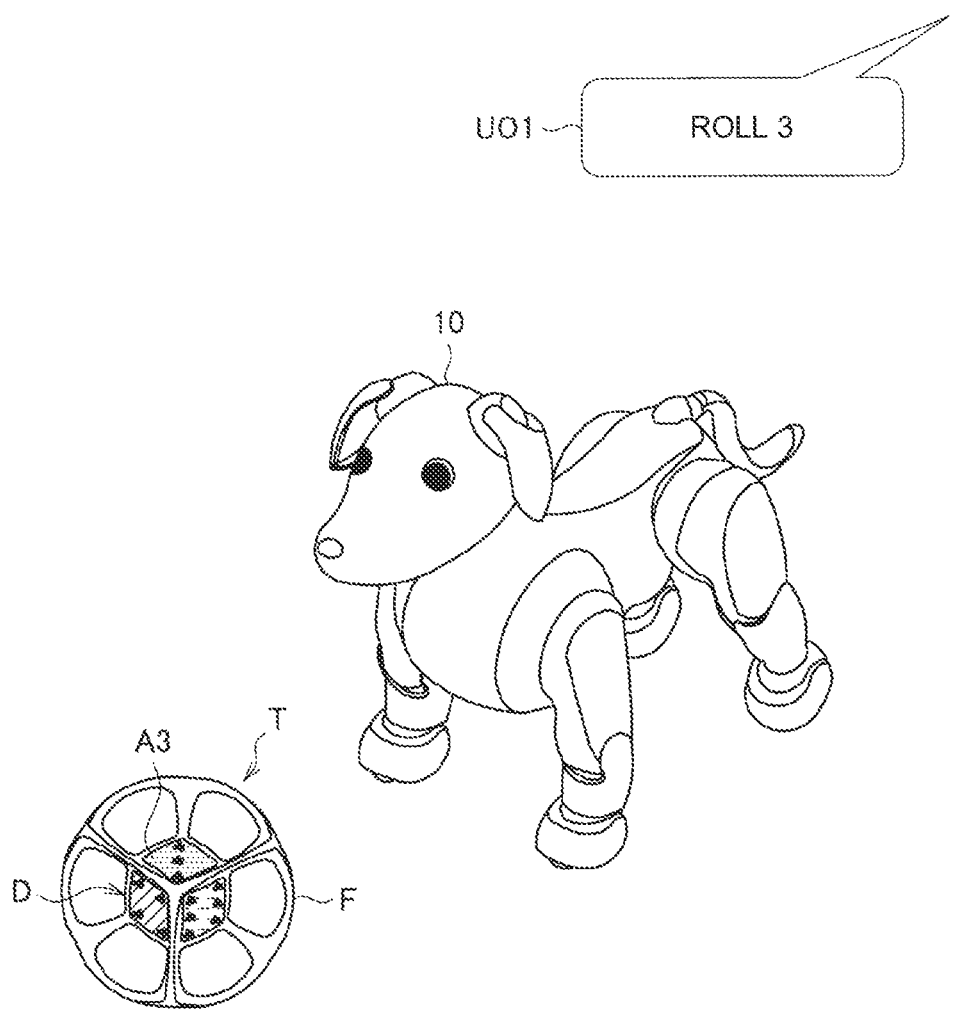
FIG. 8 is a diagram illustrating an example of operation of an autonomous operating body using the dice-shaped toy according to the embodiment.
Figure 9:
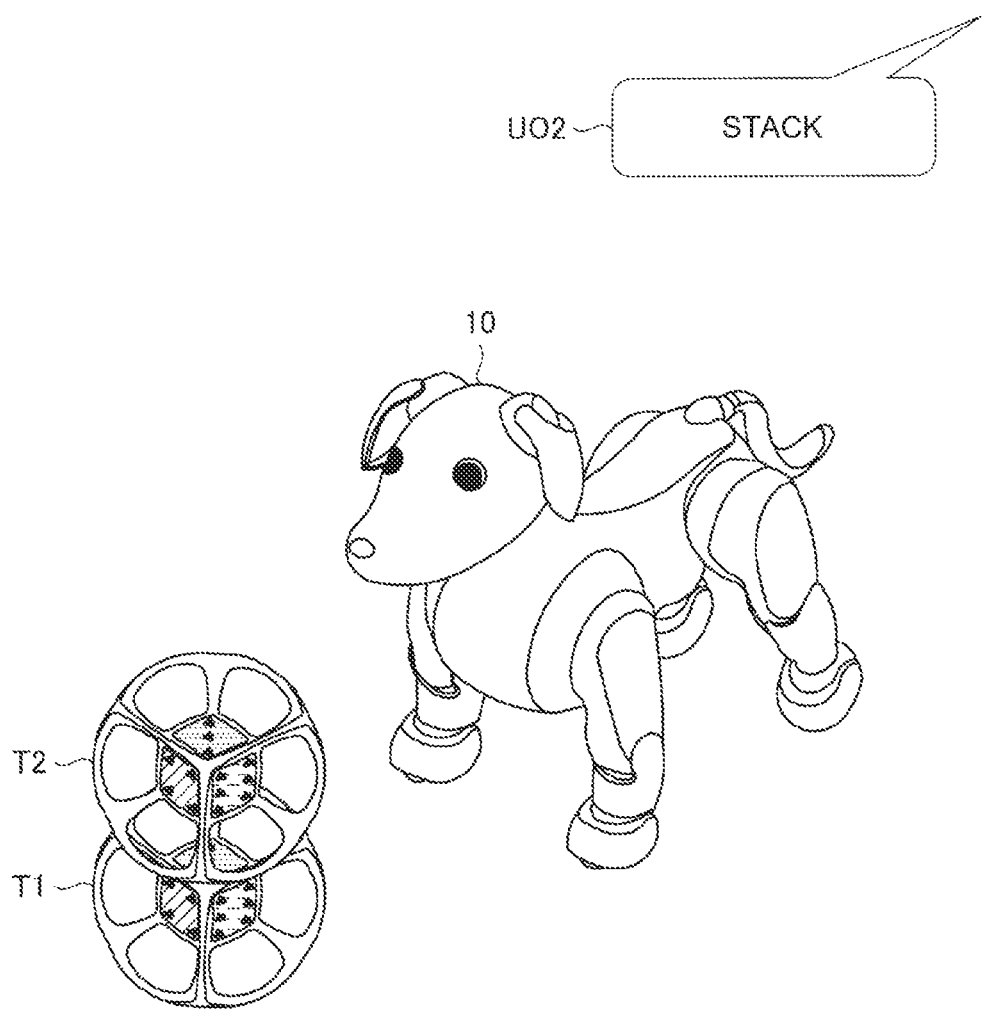
FIG. 9 is a diagram illustrating an example of operation of an autonomous operating body using the dice-shaped toy according to the embodiment.

FIGS. 8 and 9 are diagrams illustrating an example of operation of the autonomous operating body 10 using the dice-shaped toy T according to an embodiment of the present disclosure. For example, in an exemplary case illustrated in FIG. 8, the user use an utterance UO1 to instruct the autonomous operating body 10 playing with the dice-shaped toy T to present the surface A3 corresponding to the number "3".

In this case, the autonomous operating body 10 according to an embodiment of the present disclosure can recognize the plurality of surfaces A1 to AN of the dice portion D and can roll the dice-shaped toy T so that the surfaces A3 corresponding to the user's instruction comes to the top portion.

At this time, the autonomous operating body 10 according to an embodiment of the present disclosure may adjust the posture of the dice-shaped toy T so as to bring a designated number (or a pattern or the like) to the top surface by recognizing the colors given to the plurality of surfaces A1 to AN of the dice portion D.

For example, in an exemplary case illustrated in FIG. 8, different colors are given to the surfaces A1 to A6 corresponding to individual numbers. Moreover, data designating the correspondence between numbers and colors, such as "1"="blue", "2"="green", and "3"="yellow", is stored in the autonomous operating body 10.

At this time, the autonomous operating body 10 can recognize the number "3" included in the utterance UO1 and roll the dice-shaped toy T so that the surface A3 of the color "yellow" corresponding to the number comes on the top surface.

Furthermore, in an exemplary case illustrated in FIG. 9, a user uses an utterance UO2 to instruct the autonomous operating body 10 playing with the dice-shaped toys T1 and T2 to stack the dice-shaped toys T1 and T2.

At this time, the autonomous operating body 10 according to an embodiment of the present disclosure can hold and lift the dice-shaped toy T2 to be stuck on the dice-shaped toy T1. The autonomous operating body 10 according to an embodiment of the present disclosure can correctly recognize the position of the dice-shaped toy T and its own position based on the information collected by the various sensors described with reference to FIG. 1, thereby performing delicate works as described above.

An example of the operation of the autonomous operating body 10 using the dice-shaped toy T according to an embodiment of the present disclosure has been described as above. The autonomous operating body 10 according to an embodiment of the present disclosure can execute the above-described sophisticated motions onto other objects by utilizing various recognition results.

The shapes of the dice-shaped toy T illustrated in FIGS. 7A, 7B, 8 and 9 are merely an example. The shape of the dice-shaped toy T according to an embodiment of the present disclosure is not limited to such an example. The shape and material of the dice-shaped toy T according to an embodiment of the present disclosure can be appropriately modified.

Figure 10A:
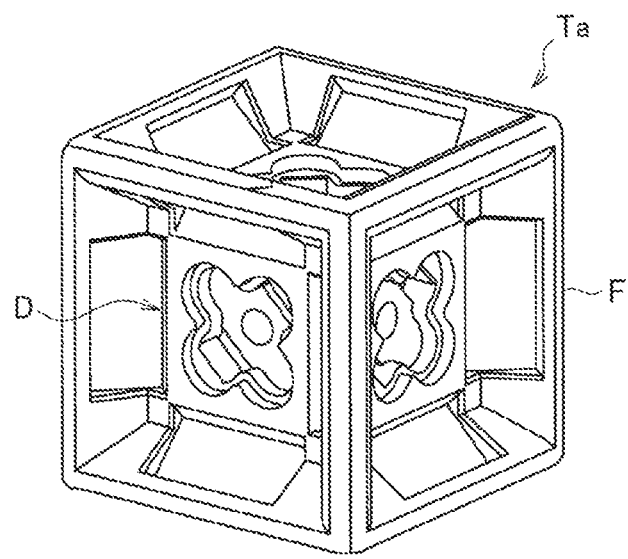
FIG. 10A is a diagram illustrating variations of the dice-shaped toy according to the embodiment.
Figure 10B:
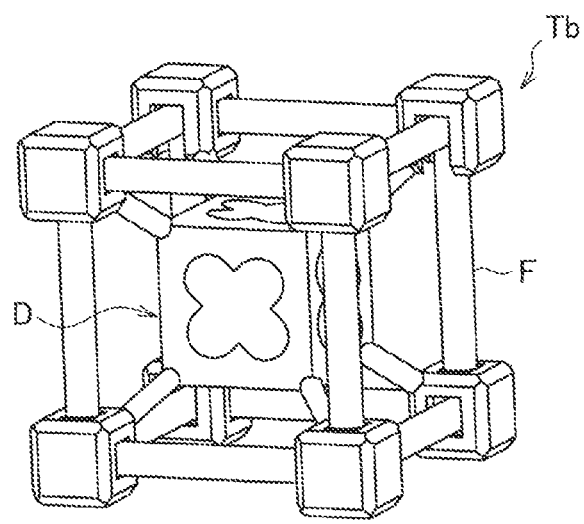
FIG. 10B is a diagram illustrating a variation of the dice-shaped toy according to the embodiment.
Figure 10C:
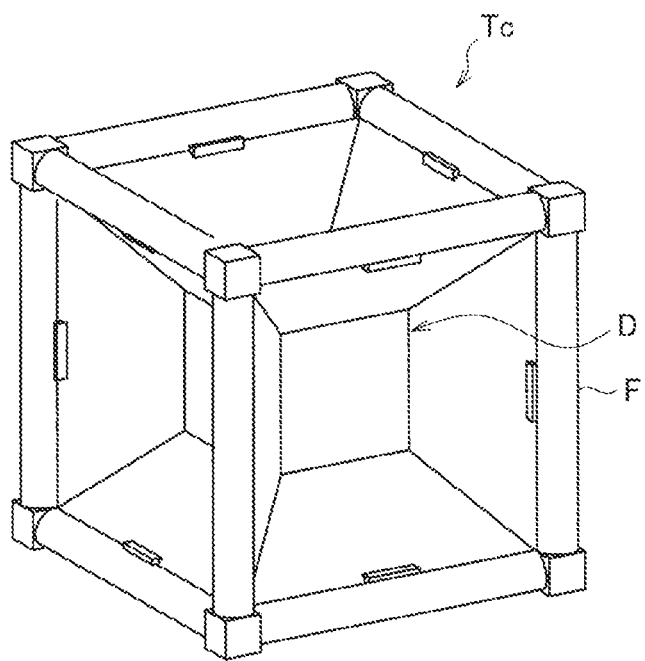
FIG. 10C is a diagram illustrating a variation of the dice-shaped toy according to the embodiment.

FIGS. 10A, 10B, and 10C are diagrams illustrating variations of the dice-shaped toy T according to an embodiment of the present disclosure. For example, FIG. 10A illustrates an example of a surface-type dice-shaped toy Ta having the outer member F formed of a straight-line shape alone.

Furthermore, FIG. 10B illustrates an example of a molecular model type dice-shaped toy Tb having the outer member F formed of a plurality of pillars and joints. Furthermore, FIG. 10C illustrates an example of a dice-shaped toy Tc having the outer member F formed of a foam material.

In this manner, the shape and material of the dice-shaped toy T according to an embodiment of the present disclosure can be flexibly modified within a range enabling lifting and rolling of the dice-shaped toy T by the autonomous operating body 10.

<<1.3. System Configuration Example>>

Next, a system configuration example according to an embodiment of the present disclosure will be described. FIG. 11 is a diagram illustrating a system configuration example according to an embodiment of the present disclosure. Referring to FIG. 11, an information processing system according to an embodiment of the present disclosure includes a plurality of autonomous operating bodies 10 and an information processing server 20. The autonomous operating body 10 and the information processing server 20 are communicably connected to each other via the network 30.

(Autonomous Operating Body 10)

The autonomous operating body 10 according to an embodiment of the present disclosure is an information processing apparatus that executes situation estimation based on collected sensor information and autonomously selects and executes various operations corresponding to the situation. As described above, the autonomous operating body 10 according to an embodiment of the present disclosure may be an autonomous mobile robot having a shape in imitation of an animal such as a human or a dog and having a moving capability. The autonomous operating body 10 according to an embodiment of the present disclosure executes voice recognition process for the detected user's utterance and executes various operations based on a result of the voice recognition process.

In the present disclosure, the autonomous operating body 10 may be referred to as a client terminal. Furthermore, in the present disclosure, the process performed by the autonomous operating body 10 may be referred to as a process on the local side.

(Information Processing Server 20)

The information processing server 20 according to an embodiment of the present disclosure is an information processing apparatus connected to a plurality of autonomous operating bodies 10 and having a function of collecting various types of information from the autonomous operating bodies 10 for analysis. Furthermore, the information processing server 20 according to an embodiment of the present disclosure has a function of transmitting a recommended utterance expression to the autonomous operating body 10 in accordance with an analysis result, a trend, a season, or the like.

In the present disclosure, the information processing server 20 is referred to as a server or an external device in some cases. Furthermore, in the present disclosure, the process performed by the information processing server 20 is referred to as a cloud-side process in some cases.

(Network 30)

The network 30 has a function of connecting the autonomous operating body 10 and the information processing server 20. The network 30 may include a public network such as the Internet, a telephone network, and a satellite communication network, or various local area networks (LANs) including Ethernet (registered trademark), wide area networks (WANs), or the like. Furthermore, the network 30 may include a dedicated network such as an Internet protocol-virtual private network (IP-VPN). The network 30 may further include a wireless communication network such as Wi-Fi (registered trademark) or Bluetooth (registered trademark).

The system configuration example according to an embodiment of the present disclosure has been described as above. The above configuration described with reference to FIG. 11 is merely an example, and the configuration of the information processing system according to an embodiment of the present disclosure is not limited to such an example. For example, the autonomous operating body 10 may further perform information communication with various external devices in addition to the information processing server 20. The above external device can include, for example, a server that transmits weather, news, and other service information, various types of information processing terminals owned by the user, and home appliances. The system configuration according to an embodiment of the present disclosure can be flexibly modified according to specifications and operations.

<<1.4. Functional Configuration Example of Autonomous Operating Body 10>>

Next, a functional configuration example of the autonomous operating body 10 according to an embodiment of the present disclosure will be described. FIG. 12 is a diagram illustrating a functional configuration example of the autonomous operating body 10 according to an embodiment of the present disclosure. Referring to FIG. 12, the autonomous operating body 10 according to an embodiment of the present disclosure includes an input unit 110, a recognition unit 120, a learning unit 130, an action planning unit 140, an operation control unit 150, a drive unit 160, an output unit 170, and a server communication unit 180. Each of the above functions is actualized by a processor such as a CPU, and ROM, RAM, or the like, mounted on the autonomous operating body 10.

(Input Unit 110)

The input unit 110 has a function of collecting various types of information related to the user and the surrounding environment. The input unit 110 collects user's utterance, environmental sounds occurring in the surroundings, image information related to the user and the surrounding environment, and various sensor information. For this purpose, the input unit 110 includes various sensors illustrated in FIG. 1.

(Recognition Unit 120)

The recognition unit 120 has a function of performing various types of recognition related to the user, the surrounding environment, and the state of the autonomous operating body 10 based on various types of information collected by the input unit 110. As an example, the recognition unit 120 may perform voice recognition, person identification, facial expression and line-of-sight recognition, object recognition, motion recognition, spatial area recognition, color recognition, shape recognition, marker recognition, obstacle recognition, step recognition, brightness recognition, and the like. The details of the function of the recognition unit 120 according to an embodiment of the present disclosure will be described below.

(Learning Unit 130)

The learning unit 130 has a function of learning the environment (situation) and behavior, and the effect of the behavior on the environment. The learning unit 130 actualizes the above learning by using a machine learning algorithm such as deep learning, for example. The learning algorithm adopted by the learning unit 130 is not limited to the above example, and can be appropriately designed.

(Action Planning Unit 140)

The action planning unit 140 has a function of planning an action to be performed by the autonomous operating body 10 based on the situation estimated by the recognition unit 120 and the knowledge learned by the learning unit 130.

(Operation Control Unit 150)

The operation control unit 150 has a function of controlling operations of the drive unit 160 and the output unit 170 based on the action plan by the action planning unit 140. The operation control unit 150 performs rotation control of the actuator 570, display control of the display 510, voice output control by the speaker, or the like, for example, based on the above action plan.

(Drive Unit 160)

The drive unit 160 has a function of bending and stretching a plurality of joints of the autonomous operating body 10 under the control of the operation control unit 150. More specifically, the drive unit 160 drives the actuator 570 included in each of joints under the control of the operation control unit 150.

(Output Unit 170)

The output unit 170 has a function of outputting visual information and sound information under the control of the operation control unit 150. For this purpose, the output unit 170 includes a display 510 and a speaker.

(Server Communication Unit 180)

The server communication unit 180 has a function of performing information communication with the information processing server 20 and other autonomous operating bodies 10. For example, the server communication unit 180 transmits information such as a voice recognition result and an utterance status described below to the information processing server 20. Furthermore, for example, the server communication unit 180 receives utterance expressions recommended from the analysis result or the like, from the information processing server 20.

The basic configuration example of the autonomous operating body 10 according to an embodiment of the present disclosure has been described as above. Subsequently, with reference to FIG. 13, a detailed configuration of the recognition unit 120 according to an embodiment of the present disclosure will be described.

Figure 13:
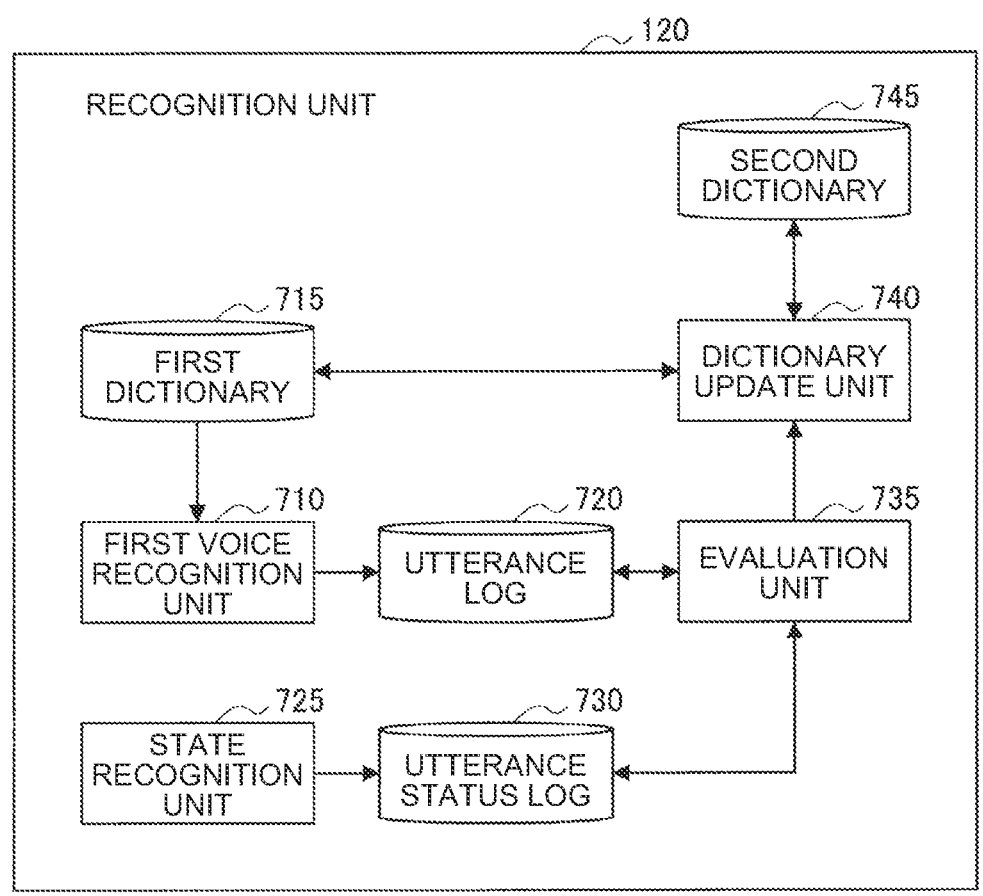
FIG. 13 is a block diagram illustrating an example of a detailed configuration of a recognition unit according to the embodiment.

FIG. 13 is a block diagram illustrating an example of a detailed configuration of the recognition unit 120 according to an embodiment of the present disclosure. Referring to FIG. 13, the recognition unit 120 according to an embodiment of the present disclosure includes a first voice recognition unit 710, a first dictionary 715, an utterance log 720, a state recognition unit 725, an utterance status log 730, an evaluation unit 735, a dictionary update unit 740, and a second dictionary 745, for example.

As illustrated in FIG. 13, the recognition unit 120 according to an embodiment of the present disclosure is characterized by including a plurality of dictionaries registering a plurality of utterance expressions. In addition, the recognition unit 120 according to an embodiment of the present disclosure performs appropriately update of the utterance expressions registered in the plurality of dictionaries according to the situation, thereby implementing voice recognition corresponding to the utterance expression set actually used by the user, making it possible to improve voice recognition accuracy while suppressing the computation amount.

The utterance expression according to an embodiment of the present disclosure may include a character string (vocabulary), an accent (word unit strength), intonation (sentence unit strength), for example.

(First Voice Recognition Unit 710)

The first voice recognition unit 710 according to an embodiment of the present disclosure executes a first voice recognition process using the first dictionary 715. Specifically, the first voice recognition unit 710 according to an embodiment of the present disclosure performs voice recognition using utterance expressions registered in the first dictionary 715 for the voice data corresponding to the user's utterance.

(First Dictionary 715)

The first dictionary 715 according to an embodiment of the present disclosure is an utterance expression dictionary used for the first voice recognition process performed by the first voice recognition unit 710. The first dictionary 715 may register a plurality of utterance expressions frequently used by the user with an upper limit of 2000 to 3000 or less. In a case where the recognition unit 120 includes a second voice recognition unit as described below, the total number of utterance expressions registered in the first dictionary 715 and the second dictionary 745 may be controlled to be 2000 to 3000 or less. The dictionary update unit 740, which will be described below, appropriately updates the utterance expressions registered in the first dictionary 715 based on usage performance of utterance of a user, making it possible to achieve highly accurate and low-burden voice recognition that would agree more with the characteristics of the user.

(Utterance Log 720)

The utterance log 720 according to an embodiment of the present disclosure is a history of voice recognition results obtained by the first voice recognition unit 710 or the like.

(State Recognition Unit 725)

The state recognition unit 725 according to an embodiment of the present disclosure recognizes various statuses (utterance status) at the time of the user's utterance based on various types of sensor information. Example of the utterance status include time (including time zone, season, etc.), location, user behavior and state, pulse code modulation (PCM) data, weather, images, various types of sensor information, operation under execution by the autonomous operating body 10, and an actuator state of the autonomous operating body 10.

(Utterance Status Log 730)

The utterance status log 730 according to an embodiment of the present disclosure is a history of the utterance status recognized by the state recognition unit 725. The utterance status log 730 according to an embodiment of the present disclosure is stored in association with the utterance log 720 using the time as a key.

(Evaluation Unit 735)

The evaluation unit 735 according to an embodiment of the present disclosure has a function of evaluating the usage performance of utterance of the user based on the utterance log 720 and the utterance status log 730. The evaluation unit 735 according to an embodiment of the present disclosure can evaluate the usage performance of utterance based on the number of utterance expressions recognized by the first voice recognition unit 710 and the utterance status recognized together with the recognition of the utterance expression. Details of the function of the evaluation unit 735 according to an embodiment of the present disclosure will be described below.

(Dictionary Update Unit 740)

The dictionary update unit 740 according to an embodiment of the present disclosure has a function of updating the utterance expressions registered in the first dictionary 715 and the second dictionary 745, based on the usage performance of utterance of the user. The dictionary update unit 740 according to an embodiment of the present disclosure may delete the utterance expression having a low usage performance of utterance from the first dictionary 715 or transfer the utterance expression to the second dictionary 745.

Furthermore, when there is a vacancy in the first dictionary 715, the dictionary update unit 740 according to an embodiment of the present disclosure may transfer the utterance expressions registered in the second dictionary 745 to the first dictionary based on the priority of the utterance expressions registered in the second dictionary 745.

In this manner, by using the dictionary update unit 740 according to an embodiment of the present disclosure, updating utterance expressions (set) in the first dictionary 715 and the second dictionary 745 based on the usage performance of utterance of the user enables the first voice recognition unit 710 to execute the first voice recognition process by using the first dictionary 715 that has registered utterance expressions having high usage performance of utterance.

According to the above-described feature of the dictionary update unit 740 according to an embodiment of the present disclosure, by registering the utterance expressions having high usage performance of utterance in the first dictionary 715 while suppressing the computation amount by limiting the number of utterance expressions registered in the first dictionary 715, it is possible to achieve execution of voice recognition with high accuracy and quick responsiveness.

(Second Dictionary 745)

In the second dictionary 745 according to an embodiment of the present disclosure, a plurality of utterance expressions not registered in the first dictionary 715 are registered. As described above, the dictionary update unit 740 according to an embodiment of the present disclosure can transfer the high-priority utterance expression registered in the second dictionary 745 to the first dictionary 715 in a case where there is a vacancy in the first dictionary 715. That is, the second dictionary 745 according to an embodiment of the present disclosure can be surely an utterance expression dictionary including a plurality of candidates for the utterance expressions to be registered to the first dictionary 715.

The detailed configuration example of the recognition unit 120 according to an embodiment of the present disclosure has been described as above. The above configuration described with reference to FIG. 13 is merely an example, and the configuration of the recognition unit 120 according to an embodiment of the present disclosure is not limited to such an example. For example, the recognition unit 120 according to an embodiment of the present disclosure may include a second voice recognition unit and a third voice recognition unit, which will be described below. Furthermore, as will be described below, the utterance log 720, the utterance status log 730, the evaluation unit 735, and the dictionary update unit 740 according to the present embodiment may be included in the information processing server 20. Details of the function of the recognition unit 120 according to an embodiment of the present disclosure will be described below.

<<1.5. Functional Configuration Example of Information Processing Server 20>>

Next, a functional configuration example of the information processing server 20 according to an embodiment of the present disclosure will be described. FIG. 14 is a diagram illustrating a functional configuration example of the information processing server 20 according to an embodiment of the present disclosure. Referring to FIG. 14, the information processing server 20 according to an embodiment of the present disclosure includes an accumulation unit 210, an analysis unit 220, a cloud dictionary 230, and a communication unit 240.

(Accumulation Unit 210)

The accumulation unit 210 according to an embodiment of the present disclosure integrates and accumulates the usage performance of utterance including voice recognition results and an utterance status recognized by a plurality of autonomous operating bodies 10. The accumulation unit 210 according to an embodiment of the present disclosure may also store information such as actions planned or executed based on the voice recognition result. The above-described data accumulated by the accumulation unit 210 according to an embodiment of the present disclosure can be referred to as knowledge from experience common to a plurality of autonomous operating bodies 10, that is, collective intelligence.

(Analysis Unit 220)

The analysis unit 220 according to an embodiment of the present disclosure performs various types of analyses based on the data accumulated by the accumulation unit 210. The analysis unit 220 analyzes the above-described data collected and accumulated from the plurality of autonomous operating bodies 10, making it possible to obtain analysis results such as a result that the user is highly likely to utter "Good boy (girl)" or "Good job", or the like, after uttering "paw". In the present disclosure, as described above, an utterance expression having a high correlation with other utterance expressions and functions, such as another utterance expression uttered after one utterance expression, is referred to as a correlative expression.

Furthermore, the analysis unit 220 according to an embodiment of the present disclosure may extract recommended utterance expressions recommended for each of the autonomous operating bodies 10 from among the utterance expressions registered in the cloud dictionary 230 based on the analysis result and may transmit the extracted expressions to the autonomous operating body 10 via the communication unit 240.

(Cloud Dictionary 230)

The cloud dictionary 230 according to an embodiment of the present disclosure is an utterance expression dictionary including various utterance expressions that can be newly added to the autonomous operating body 10. In the cloud dictionary 230, for example, dialects, utterance expressions frequently used for each generation (generational expressions), seasonal utterance expressions (seasonal expressions), utterance expressions in trend (trending expressions), and correlative expressions obtained by analysis performed by the analysis unit 220 based on collective intelligence are registered.

(Communication Unit 240)

The communication unit 240 according to an embodiment of the present disclosure performs information communication with a plurality of autonomous operating bodies 10 via the network 30. The communication unit 240 receives information related to the usage performance of utterance such as the voice recognition result and the utterance status from the autonomous operating body 10, for example. Furthermore, the communication unit 240 transmits the utterance expressions registered in the cloud dictionary 230 to the autonomous operating body 10 based on the control by the analysis unit 220 and the request from the autonomous operating body 10.

The functional configuration example of the information processing server 20 according to an embodiment of the present disclosure has been described as above. The above configuration described with reference to FIG. 14 is merely an example, and the functional configuration of the information processing server 20 according to an embodiment of the present disclosure is not limited to such an example. The functional configuration of the information processing server 20 according to an embodiment of the present disclosure can be flexibly modified according to specifications and operations.

<2. Functional Details>

Next, the dictionary update function according to an embodiment of the present disclosure will be described in detail. As described above, the dictionary update unit 740 according to an embodiment of the present disclosure dynamically updates an utterance expression set included in the first dictionary 715 and the second dictionary 745 based on the usage performance of utterance of the user, thereby enabling the first voice recognition unit 710 to realize highly accurate voice recognition with a limited number of utterance expressions registered in the first dictionary 715.

Figure 15A:
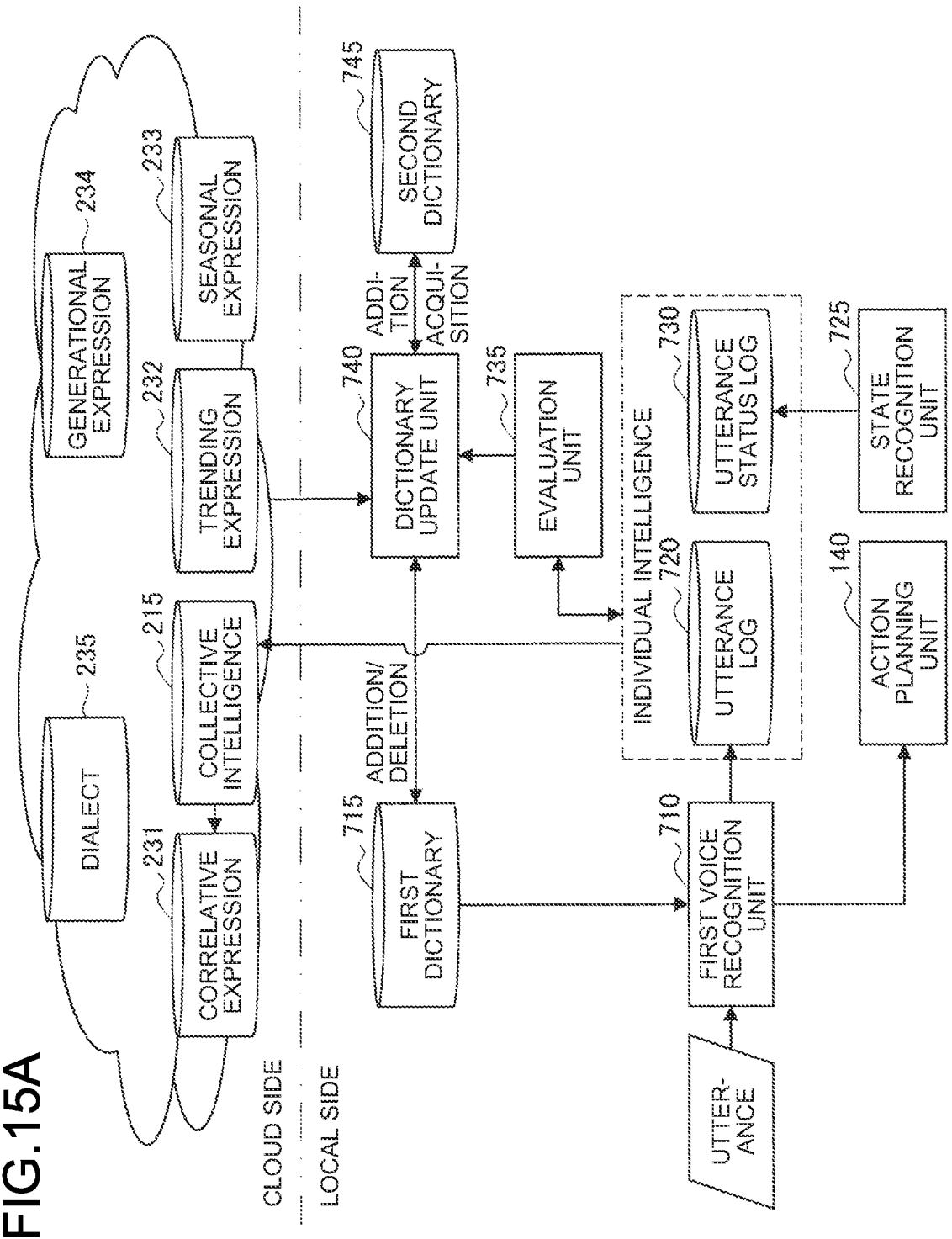
FIG. 15A is a diagram illustrating an outline of dictionary update according to the embodiment.
Figure 15B:
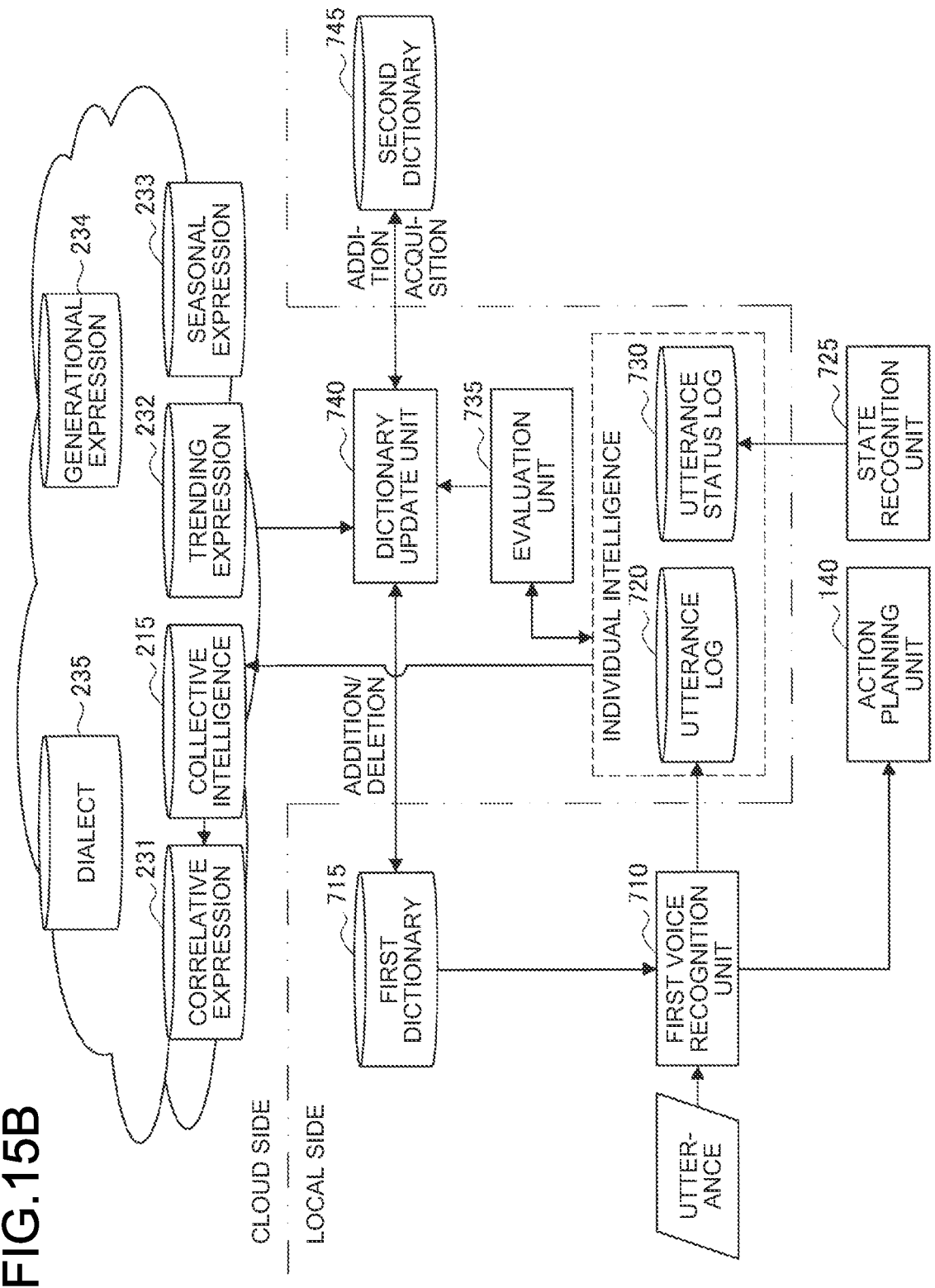
FIG. 15B is a diagram illustrating a configuration in a case where an utterance log, an utterance status, an evaluation unit, and a dictionary update unit according to the embodiment are provided in an information processing server.

FIGS. 15A and 15B are diagrams illustrating an outline of dictionary update according to an embodiment of the present disclosure. Note that FIGS. 15A and 15B are illustrated mainly focusing on the function of the recognition unit 120 among the configurations included in the autonomous operating body 10, and thus, FIGS. 15A and 15B omit some of the configurations, such as the input unit 110 and the server communication unit 180. Furthermore, FIG. 15A illustrates a configuration in which the utterance log 720, the utterance status log 730, the evaluation unit 735, and the dictionary update unit 740 according to the present embodiment are provided in the autonomous operating body 10. Alternatively, the utterance log 720, the utterance status log 730, the evaluation unit 735, and the dictionary update unit 740 according to the present embodiment may be provided as the functions of the information processing server 20 as illustrated in FIG. 15B. In this case, the utterance and the utterance status recognized by the autonomous operating body 10 may be transmitted to the information processing server 20 via the network 30, and the information processing server 20 may update the first dictionary 715 and the second dictionary 745 via the network 30.

In the voice recognition process performed by the autonomous operating body 10 according to an embodiment of the present disclosure, as illustrated in the lower left of the figures of FIGS. 15A and 15B, PCM data of the utterance detected by the input unit 110 is first input to the first voice recognition unit 710.

At this time, the first voice recognition unit 710 executes the first voice recognition process on the above PCM data using the first dictionary 715. At this time, the result of the first voice recognition process is input to the action planning unit 140, and then, the action planning unit 140 performs an action plan based on the input result of the first voice recognition process, thereby implementing operation control by the operation control unit 150 and output operations by the drive unit 160 and the output unit 170.

Furthermore, the result of the first voice recognition process obtained by the first voice recognition unit 710 is stored as the utterance log 720. Furthermore, the state recognition unit 725 recognizes the above-described utterance status based on the collected sensor information or the like, and stores the status as the utterance status log 730. At this time, as described above, the utterance status log 730 is stored in association with the utterance log 720 using the time as a key. In contrast to the above-described collective intelligence, the utterance log 720 and the utterance status log 730 according to an embodiment of the present disclosure can be referred to as individual intelligence based on the unique experience of each of the autonomous operating bodies 10. The utterance log 720 and the utterance status log 730, which are individual intelligence, are transmitted to the information processing server 20 via the network 30 and then stored in the accumulation unit 210 as a part of a collective intelligence 215.

Furthermore, the evaluation unit 735 according to an embodiment of the present disclosure evaluates the usage performance of utterance of the user based on the individual intelligence accumulated as described above. For example, the evaluation unit 735 according to an embodiment of the present disclosure may perform evaluation such that the more the number of times of utterance expression has been recognized by the first voice recognition unit 710, the higher the usage performance of utterance is, for example. Alternatively, in order to deal with erroneous recognition and false-positive recognition by the first voice recognition unit 710 or the like, the evaluation unit 735 may comprehensively evaluate the usage performance of utterance based on the utterance status or the like. Here, erroneous recognition is a case where the first voice recognition unit 710 outputs "Good night", for example, which is a recognition result other than "Good morning", for the user's actual utterance "Good morning". In addition, false-positive recognition is a case where a recognition result is output for sounds such as daily life sounds, other than the user's utterance, specifically, a recognition result of "bang" is output for the sound generated by closing the door, for example.

In addition, the dictionary update unit 740 according to an embodiment of the present disclosure updates the first dictionary 715 and the second dictionary 745 based on the usage performance of utterance evaluated by the evaluation unit 735. As described above, the dictionary update unit 740 can delete the utterance expression having a low usage performance of utterance from the first dictionary 715 or transfer it to the second dictionary 745, and can register the utterance expression to be registered to the second dictionary 745 with high priority, to the first dictionary instead of the deleted expression.

Furthermore, the dictionary update unit 740 according to an embodiment of the present disclosure may include a function of acquiring an unregistered utterance expression from the information processing server 20 and additionally registering the utterance expression to the first dictionary 715 and the second dictionary 745. For example, the dictionary update unit 740 may acquire a correlative expression 231, a trending expression 232, a seasonal expression 233, a generational expression 234, a dialect 235, or the like described above, and may additionally register the acquired expressions to the first dictionary 715 and the second dictionary 745. At this time, in order to keep the number of utterance expressions to a certain level or less, the dictionary update unit 740 may delete the utterance expressions having low usage performance of utterance from the first dictionary 715 and the second dictionary 745.

According to the above-described functions of the dictionary update unit 740 according to an embodiment of the present disclosure, incorporating a new utterance expression not registered in the autonomous operating body 10 from the outside makes it possible to implement highly accurate and flexible voice recognition capable of following the change of the situation.

Figure 16:
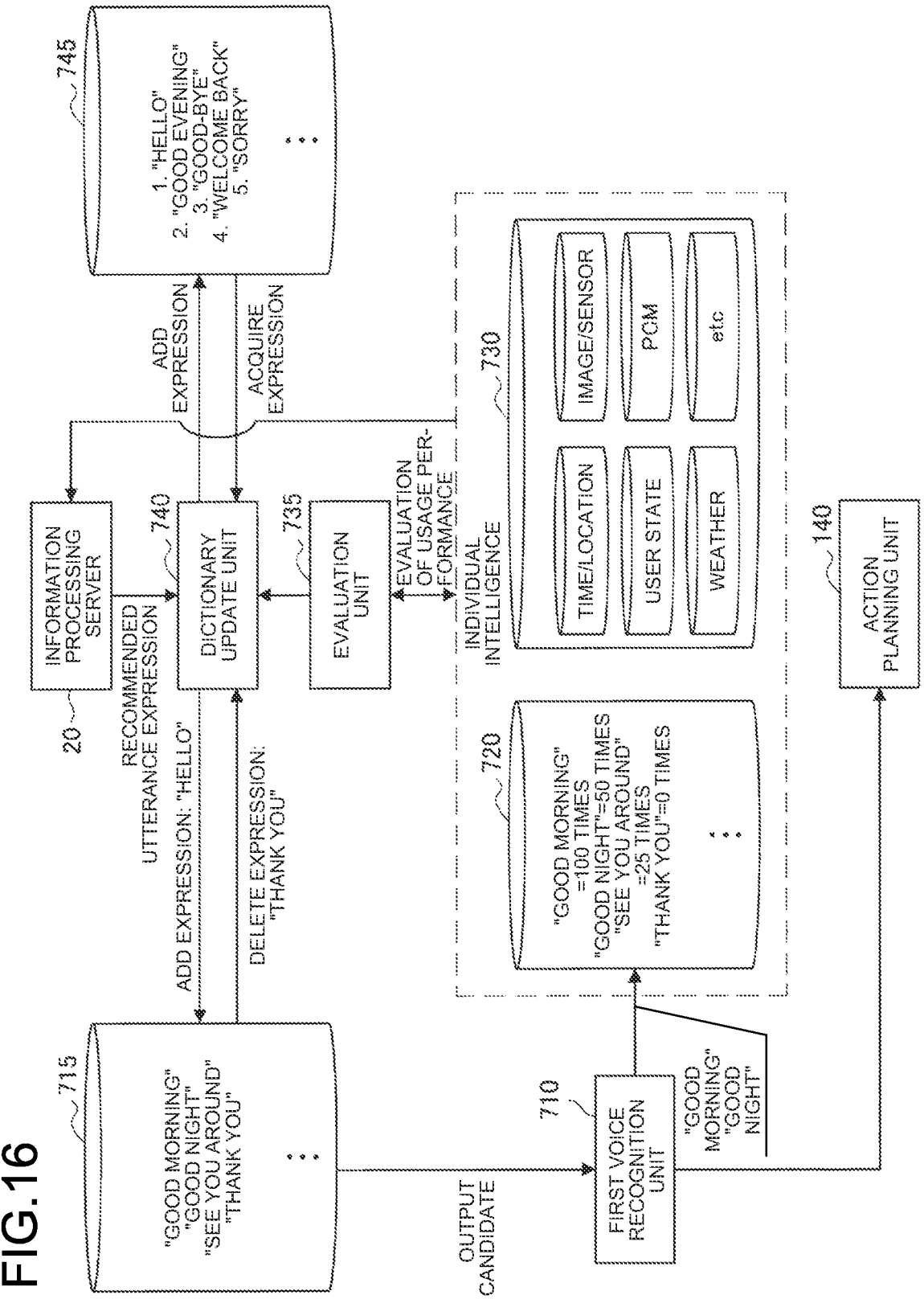
FIG. 16 is a diagram illustrating a specific example of dictionary update according to the embodiment.

Subsequently, with reference to FIG. 16, the dictionary update according to an embodiment of the present disclosure will be described with reference to specific examples. FIG. 16 is a diagram illustrating a specific example of dictionary update according to an embodiment of the present disclosure.

In an exemplary case illustrated in FIG. 16, a plurality of utterance expressions such as "Good morning", "Good night", "See you around", and "Thank you" are registered, at the initial stage, in the first dictionary 715, and the first voice recognition unit 710 performs a first voice recognition process based on the above utterance expression registered in the first dictionary 715.

At this time, results of the first voice recognition process by the first voice recognition unit 710 are accumulated in the utterance log 720. FIG. 16 schematically illustrates an example in which "Good morning" has been recognized 100 times, "Good night" has been recognized 50 times, "See you around" has been recognized 25 times, and "Thank you" has been recognized 0 times, during a predetermined period, based on the utterance expressions registered in the first dictionary 715.

At this time, the evaluation unit 735 according to an embodiment of the present disclosure may evaluate the usage performance of utterance related to each of utterance expressions based on the above-described number of times of recognition. The evaluation unit 735 can evaluate that, for example, the usage performance of utterance for each of "Good morning", "Good night", and "See you around" is high, and evaluate that the usage performance of utterance of "Thank you" for which the number of times of recognition is less than the predetermined number is low.

In this case, the dictionary update unit 740 according to an embodiment of the present disclosure may delete the utterance expression "Thank you" evaluated as having a low usage performance of utterance from the first dictionary 715, and may transfer the utterance expression "Thank you" to the second dictionary 745. Instead of this, the dictionary update unit 740 may acquire "Hello", which is an utterance expression having a high priority, from the second dictionary 745, and may perform additional registration of this expression to the first dictionary.

In this manner, with the evaluation unit 735 and the dictionary update unit 740 according to an embodiment of the present disclosure, dynamically controlling the utterance expression set to be registered to the first dictionary 715 based on the usage performance of utterance will make it possible to suppress the number of utterance expressions to be registered to the first dictionary 715 to a necessary and sufficient level, enabling effective reduction of the computation amount and achievement of voice recognition with high accuracy.

Note that the priority of the utterance expression registered to the second dictionary 745 may be set based on the analysis result of collective intelligence or general knowledge, obtained by the information processing server 20. According to such a method, it is possible to set a high priority for utterance expressions that are frequently uttered. The dictionary update unit 740 can also acquire recommended utterance expressions (for example, a trending expression) often used in social networking services (SNSs), for example, from the information processing server 20, and can set the priority based on the recommendation level calculated by the analysis unit 220 based on the frequency of occurrence of the expression in the SNS.

Furthermore, the dictionary update unit 740 according to an embodiment of the present disclosure may set the priority of the correlative expression acquired based on the usage performance of utterance collected from the autonomous operating body 10 carried by another user having similar profiles regarding age, gender, region, or the like, among the correlative expressions obtained from the collective intelligence analysis result obtained by the information processing server 20.

Furthermore, the priority of the utterance expression to be registered to the second dictionary 745 may be set based on meta-categories, for example. For example, when an utterance expression "Bye-bye" which is a farewell greeting is already registered in the first dictionary 715, the priority of an utterance expression "Good-bye" which is another farewell greeting may be set low.

The dictionary update according to an embodiment of the present disclosure has been described above with specific examples. Although the above description is a case where the evaluation unit 735 evaluates the usage performance of utterance of each of the utterance expressions based solely on the number of recognitions by the first voice recognition process, the evaluation unit 735 according to an embodiment of the present disclosure can perform evaluation with higher accuracy by referring to the utterance status.

For example, in the example illustrated in FIG. 16, the utterance expression "Good morning" has been recognized 50 times. At this time, in a case where the time of recognition of the utterance expression "Good morning" is at night or the like, the evaluation unit 735 may determine that the recognition result is obtained due to erroneous recognition or false-positive recognition by the first voice recognition unit 710, and may make low evaluation for the usage performance of utterance regarding the utterance expression "Good morning".

Furthermore, for example, in the example illustrated in FIG. 16, in a case where the utterance expression "See you around" is recognized when the user returns home or when the user has not gone out for a predetermined time or more after the utterance, the evaluation unit 735 may determine that the recognition result is due to erroneous recognition or false-positive recognition by the first voice recognition unit 710, and may make low evaluation for the usage performance of utterance regarding the utterance expression "See you around".

In this manner, the evaluation unit 735 according to an embodiment of the present disclosure can evaluate the usage performance of utterance related to each of utterance expressions with high accuracy by considering not only the number of recognitions but also the utterance status.

At this time, the evaluation unit 735 according to an embodiment of the present disclosure may calculate a level of sureness indicating the probability that the utterance expression has been actually uttered by the user based on the number of times of recognition, a level of confidence related to the recognition, and various utterance statuses, and may use the level of sureness (for example, 0 to 1) as an evaluation value related to the usage performance of utterance.

Examples of utterance status include time of utterance (When), place of utterance (Where), utterer (Who), intention (What, Why, How) acquired by natural language understanding, utterance direction, image, various types of sensor information, and information acquired by the microphone.

The evaluation unit 735 according to an embodiment of the present disclosure may calculate the level of sureness by using the following Formula (1).

$$\text{Sureness} = \sum_{i=0}^{n} S_i * w_i = w_{times} S(\text{times}) + w_{conf} S(Conf) + \ldots \quad (1)$$

In Formula (1), S is an utterance status and w is a weight. The evaluation unit 735 according to an embodiment of the present disclosure can apply various utterance statuses to each of utterance expressions to calculate the level of sureness, and thereby can separate between the utterance expressions having a possibility of erroneous recognition or false-positive recognition from the utterance expressions that is highly likely to be actually uttered by the user.

By using the above Formula (1), the evaluation unit 735 is capable of calculating a low evaluation value for utterance expressions such as: an utterance expression related to the recognition result with low level of confidence, an utterance expression with a small number of times of recognition, an utterance expression recognized when no one is around, an utterance expression detected in a direction in which the television device is located, and an utterance expression detected in a direction in which living sounds are likely to be heard, such as the kitchen.

With the above-described functions of the evaluation unit 735 according to an embodiment of the present disclosure, for example, the dictionary update unit 740 can delete the utterance expressions having the level of sureness 0.5 or less from the first dictionary 715 and can keep the utterance expressions highly likely to be actually uttered in the first dictionary 715.

Furthermore, the level of sureness according to an embodiment of the present disclosure may be calculated based on the above-described collective intelligence. In this case, the correlation between individual utterance statuses is clarified by accumulated data, and it is possible to achieve advantageous effects of discovery of utterance statuses that have a large impact on the level of sureness and optimization of weights given as initial values. Furthermore, the above-described advantageous effects lead to enhancement in the accuracy of the level of sureness and in the optimization of the first dictionary 715 for the user, enabling improvement of the voice recognition accuracy.

The calculation of the level of sureness according to an embodiment of the present disclosure has been described as above. Note that the evaluation unit 735 according to an embodiment of the present disclosure may execute calculation of the level of sureness and the dictionary update based on the sureness, for example, either regularly such as every week or every month, or irregularly.

Next, dictionary update using a second voice recognition process according to an embodiment of the present disclosure will be described. The above description is an exemplary case where the autonomous operating body 10 according to an embodiment of the present disclosure operates based on the result of the first voice recognition process using the first dictionary 715. In addition, the autonomous operating body 10 according to an embodiment of the present disclosure may further execute the second voice recognition process using the second dictionary 745 and may further operate based on the result of the second voice recognition process.

Furthermore, in this case, the evaluation unit 735 according to an embodiment of the present disclosure may evaluate each of the usage performance of utterance using the result of the second voice recognition process, and the dictionary update unit 740 may perform dictionary update based on a result of the evaluation. At this time, in order to suppress the computation amount, the dictionary update unit 740 may suppress the total number of utterance expressions of the first dictionary 715 and the second dictionary 745 to a certain number or less, such as 2000 to 3000.

Figure 17:
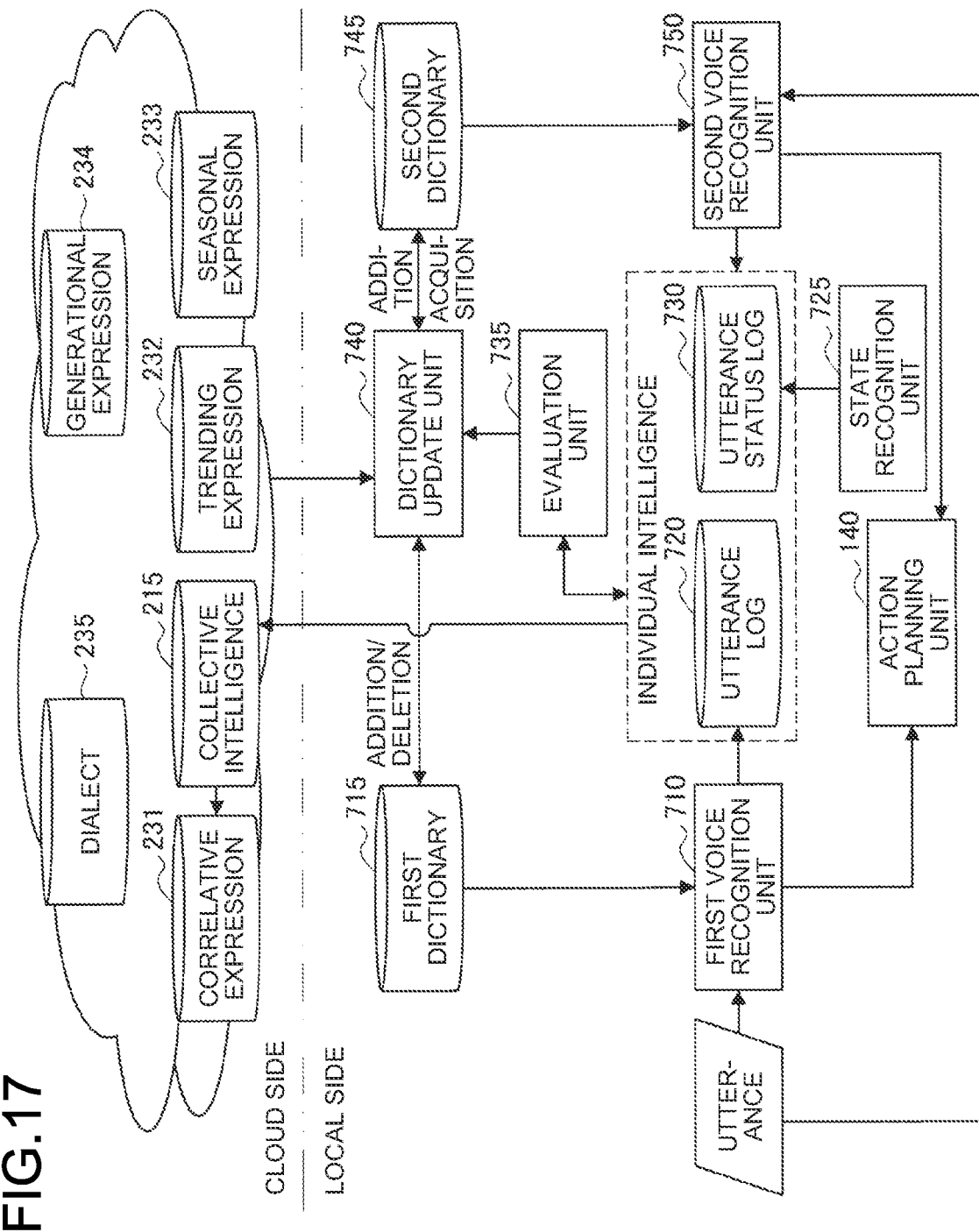
FIG. 17 is a diagram illustrating an outline of a second voice recognition process according to the embodiment.

FIG. 17 is a diagram illustrating an outline of the second voice recognition process according to an embodiment of the present disclosure. As illustrated in FIG. 17, the recognition unit 120 according to an embodiment of the present disclosure can further include a second voice recognition unit 750 that executes the second voice recognition process using the second dictionary 745, in addition to the first voice recognition unit 710 that executes the first voice recognition process using the first dictionary 715. Although FIG. 17 illustrates a configuration in a case where the utterance log 720, the utterance status log 730, the evaluation unit 735, and the dictionary update unit 740 are included in the autonomous operating body 10, each of the above configurations according to the present embodiment may be provided in the information processing server 20 as illustrated in FIG. 15B.

At this time, the first voice recognition unit 710 and the second voice recognition unit 750 may execute the first voice recognition process and the second voice recognition process in real time for an identical utterance that has been detected, for example. Furthermore, the result of the second voice recognition process is accumulated in the utterance log 720, similarly to the result of the first voice recognition process. The evaluation unit 735 may evaluate the usage performance of utterance of the second dictionary 745, which is a candidate for utterance expression, and may change the priority of the utterance expressions registered in the second dictionary 745 based on the evaluation.

The second voice recognition process performed by the second voice recognition unit 750 may include an algorithm that takes longer than the one in the first voice recognition process performed by the first voice recognition unit 710 but has a recognition accuracy higher than that of the first voice recognition unit 710. For example, it is possible to improve the recognition accuracy by combining the utterance data and the utterance status. At this time, the result of the second voice recognition process using the second dictionary 745, which has more utterance expressions than the first dictionary 715, is input to the action planning unit 140 later than the result of the first voice recognition process.

Figure 18:
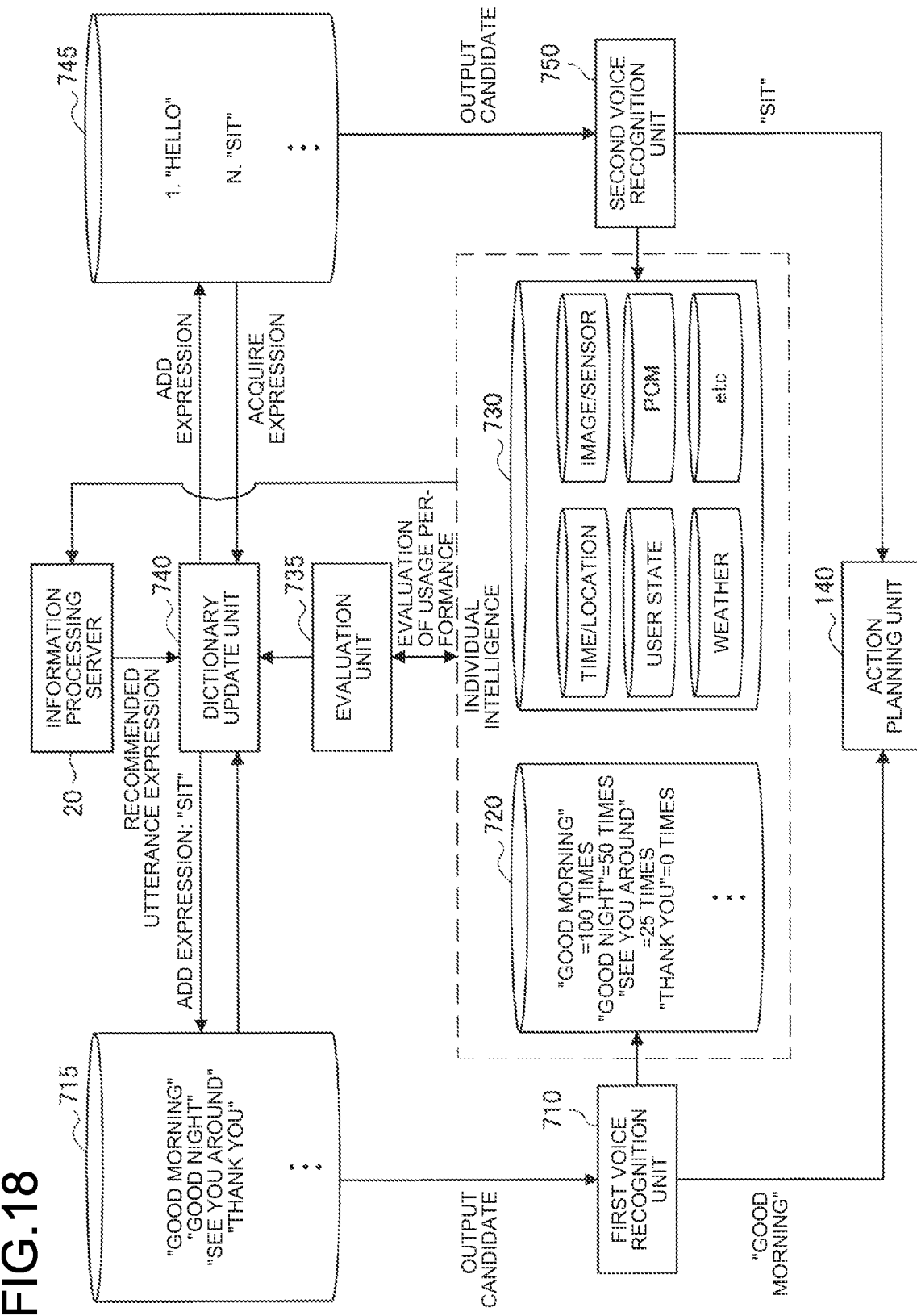
FIG. 18 is a diagram illustrating a specific example of dictionary update based on the second voice recognition process according to the embodiment.

FIG. 18 is a diagram illustrating a specific example of dictionary update based on the second voice recognition process according to an embodiment of the present disclosure. In an example illustrated in FIG. 18, as illustrated on the left side of the figure, the first voice recognition unit 710 executes the first voice recognition process using the first dictionary 715 for the detected utterance, outputs "Good morning", an utterance expression being a result of the recognition, to the action planning unit 140, and stores the recognition result related to the utterance expression "Good morning" in the utterance log 720.

Furthermore, as illustrated on the right side in the figure, the second voice recognition unit 750 according to an embodiment of the present disclosure executes the second voice recognition process using the second dictionary for the same utterance, outputs "Sit" an utterance expression as a result of the recognition to the action planning unit 140, and stores the recognition result related to the utterance expression "Sit" in the utterance log 720.

In this manner, with the second voice recognition unit 750 according to an embodiment of the present disclosure, it is possible to correctly recognize the utterance expression not registered in the first dictionary 715 by using the second dictionary 745.

Furthermore, in this case, the evaluation unit 735 according to an embodiment of the present disclosure can evaluate the usage performance of each of the utterance expressions with high accuracy based on the result of the second voice recognition process performed by the second voice recognition unit 750. For example, in a case where a set of utterance expressions registered in the first dictionary 715 is a subset of the utterance expression set registered in the second dictionary 745, the evaluation unit 735 may determine that the result of the second voice recognition process, which has been recognized based on the larger number of utterance expressions, is correct.

In contrast, in a case where the utterance expressions registered in the first dictionary 715 and the second dictionary 745 are unique to each other, the evaluation unit 735 may determine one of the recognition results is correct based on the level of confidence and the utterance status regarding each of the results of voice recognition processes.

Furthermore, the dictionary update unit 740 according to an embodiment of the present disclosure can update the dictionary based on the above determination made by the evaluation unit 735. In the exemplary case illustrated in FIG. 18, based on the determination made by the evaluation unit 735 that the result of the second voice recognition process is correct, the dictionary update unit 740 additionally registers the utterance expression "Sit" that has been registered in the second dictionary 745, to the first dictionary 715.

In this manner, by using the second voice recognition process according to an embodiment of the present disclosure, it is possible to transfer the utterance expression registered in the second dictionary 745 to the first dictionary 715 based on the actual usage performance of utterance of the user, in addition to the preset priority.

Furthermore, by using the action planning unit 140 according to an embodiment of the present disclosure, the action plan formulated based on the result of the first voice recognition process can be corrected based on the result of the second voice recognition process that has been input following the result of the first voice recognition process.

Figure 19:
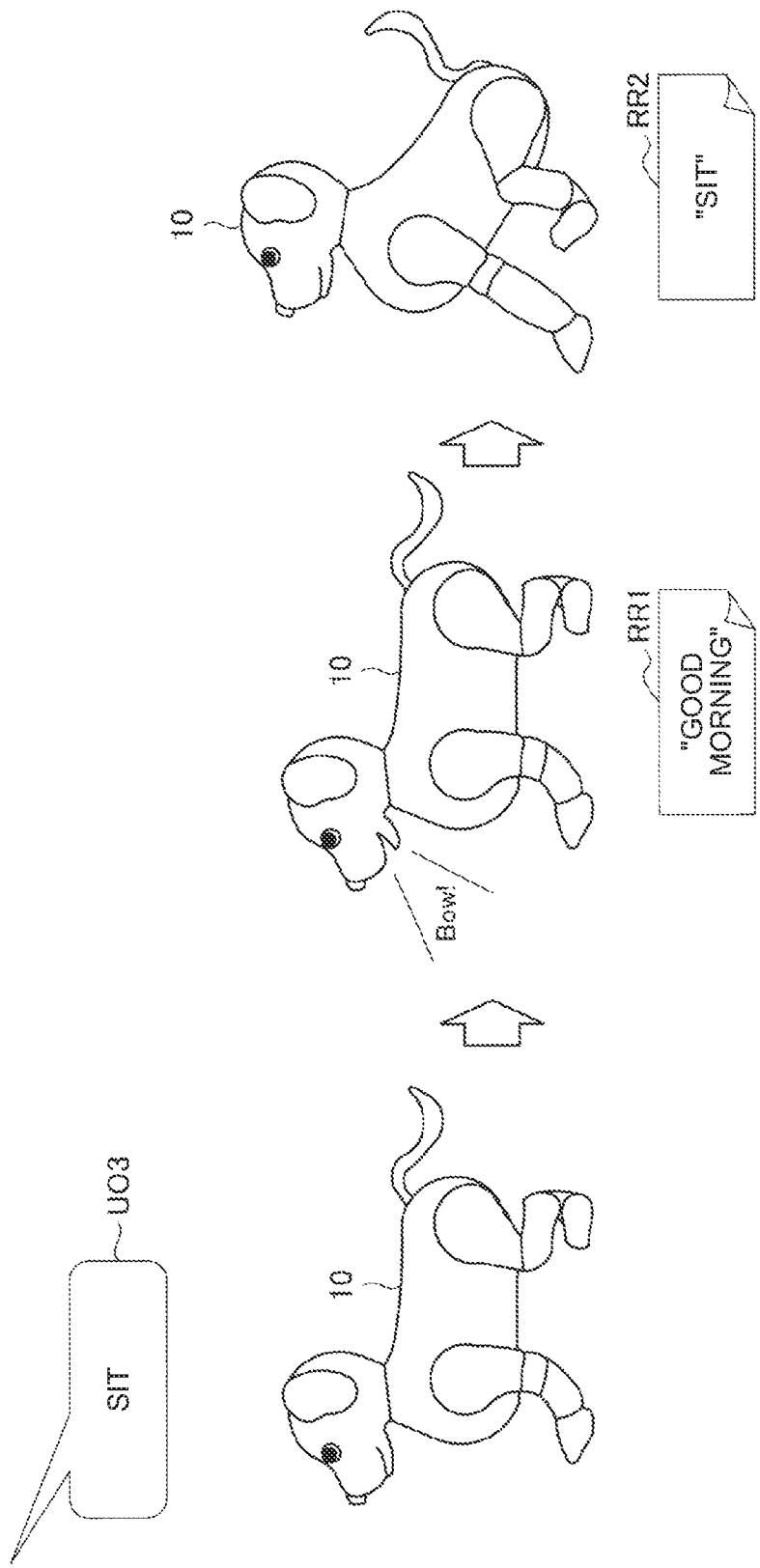
FIG. 19 is a diagram illustrating a correction of an action plan based on a result of the second voice recognition process according to the embodiment.

FIG. 19 is a diagram illustrating a correction of the action plan based on the result of the second voice recognition process according to an embodiment of the present disclosure. In an exemplary case illustrated in FIG. 19, as illustrated on the left side of the figure, the user first performs an utterance UO3 including an utterance expression "Sit".

In this case, as illustrated in the center of the figure, a result RR1 of the first voice recognition process performed by the first voice recognition unit 710 using the first dictionary 715, which contains fewer utterance expressions than the second dictionary, will be input, with higher priority, into the action planning unit 140. In an exemplary case illustrated in FIG. 19, since the utterance expression "Sit" is not registered in the first dictionary 715, the first voice recognition unit 710 erroneously recognizes the utterance UO3 as "Good morning" and inputs a result RR1 of the first voice recognition process regarding "Good morning" into the action planning unit 140.

At this time, the action planning unit 140 according to an embodiment of the present disclosure plans an action of barking as a response to "Good morning" based on the result RR1 of the first voice recognition process, and then, the operation control unit 150 controls the drive unit 160 and the output unit 170 based on the plan.

Furthermore, in parallel with the action plan and the action control based on the result RR1 of the first voice recognition process, a result RR2 of the second voice recognition process will be input into the action planning unit 140 with some delay, as illustrated on the right side in the figure.

Here, in a case where the input second voice recognition process result RR2 is different from the first voice recognition process result RR1, the action plan formulated based on the result RR1 of the first voice recognition process may be corrected by the action planning unit 140 according to an embodiment of the present disclosure based on the result RR2 of the second voice recognition process.

For example, in the exemplary case illustrated in FIG. 19, the action planning unit 140 cancels the plan related to the action of barking described above, and newly plans a new action of "Sit" based on the result RR2 of the second voice recognition process.

In this manner, by correcting the action plan based on the second voice recognition result according to an embodiment of the present disclosure, it is possible, after making a quick response to the utterance based on the result of the first voice recognition process, to implement operations such as correcting the action based on the highly accurate result of the second voice recognition process.

The above behavioral changes are particularly effective for autonomous operating bodies formed in imitation of humans and animals, from which users expect quick responses. By correcting the action plan based on the result of the second voice recognition process according to an embodiment of the present disclosure, it is possible to improve the user's satisfaction level by executing the operation based on the high-accuracy voice recognition process result while maintaining the speed of response.

Subsequently, correction of the usage performance of utterance based on a result of a third voice recognition process according to an embodiment of the present disclosure will be described. The above description is a case where the autonomous operating body 10 according to an embodiment of the present disclosure performs the first voice recognition process using the first dictionary 715 and the second voice recognition process using the second dictionary 745. In contrast, the autonomous operating body 10 according to an embodiment of the present disclosure may execute a third voice recognition process by using a large dictionary 755 that has registered a larger number and more various utterance expressions as compared with the first dictionary 715 and the second dictionary 745.

Figure 20:
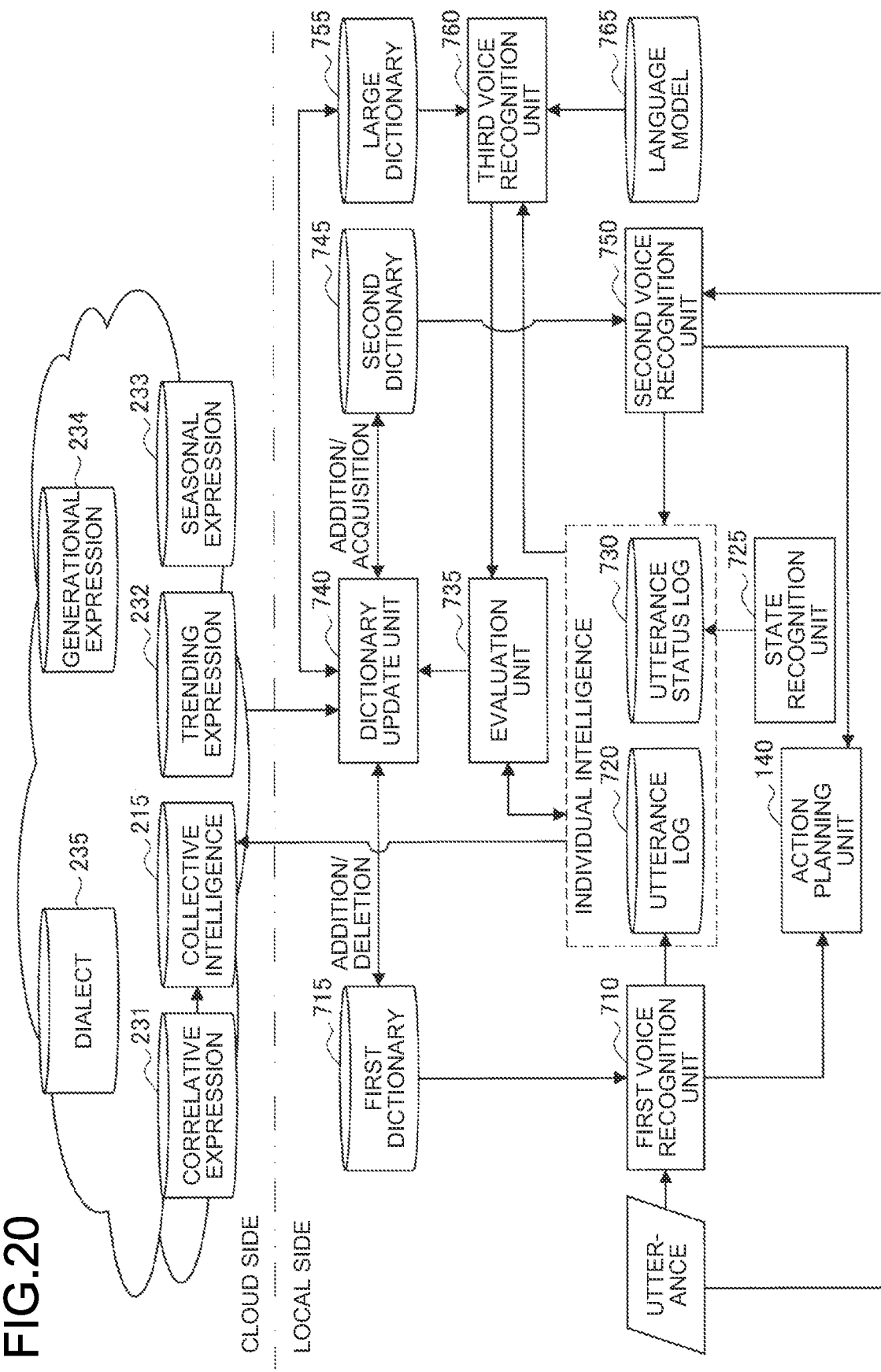
FIG. 20 is a diagram illustrating a third voice recognition process using a large dictionary according to the embodiment.

FIG. 20 is a diagram illustrating a third voice recognition process using the large dictionary 755 according to an embodiment of the present disclosure. Referring to FIG. 20, the recognition unit 120 according to an embodiment of the present disclosure can include a third voice recognition unit 760 that executes the third voice recognition process using the large dictionary 755 in addition to the first voice recognition unit 710 and the second voice recognition unit 750. Note that although FIG. 20 illustrates a configuration in a case where the utterance log 720, the utterance status log 730, the evaluation unit 735, and the dictionary update unit 740 are included in the autonomous operating body 10, each of the above configurations according to the present embodiment may be provided in the information processing server 20 as illustrated in FIG. 15B.

At this time, unlike the first voice recognition process and the second voice recognition process, the third voice recognition unit 760 according to an embodiment of the present disclosure may execute the voice recognition process afterward using PCM data stored as a part of the utterance status log 730. In addition, the evaluation unit 735 according to an embodiment of the present disclosure may re-evaluate the usage performance of utterance of each of the utterance expressions accumulated in the utterance log 720 based on the result of the third voice recognition process performed by the third voice recognition unit 760.

The third voice recognition unit 760 according to an embodiment of the present disclosure can execute the third voice recognition process using the large dictionary 755 that has registered a large number of various utterance expressions during a time zone in which the usage rate of computational resources is predicted to be less than a threshold, for example, after user's bedtime, making it possible to obtain a voice recognition result with an extremely high accuracy by utilizing the surplus computational resources.

Furthermore, the third voice recognition unit 760 according to an embodiment of the present disclosure can also perform a third voice recognition process using a language model 765 different from the model used in the first voice recognition unit 710 and the second voice recognition unit 750. For example, in a case where the first voice recognition unit 710 and the second voice recognition unit 750 perform voice recognition process using a Japanese language model, the third voice recognition unit 760 may perform the third voice recognition process by using a language model 765 such as English or Chinese in addition to Japanese.

With the use of the above-described functions included in the third voice recognition unit 760 according to an embodiment of the present disclosure, the results of the first voice recognition process and the second voice recognition process performed in real time can be re-evaluated afterward with the result of the highly accurate third voice recognition process, making it possible to execute voice recognition corresponding to more various languages.

Figure 21:
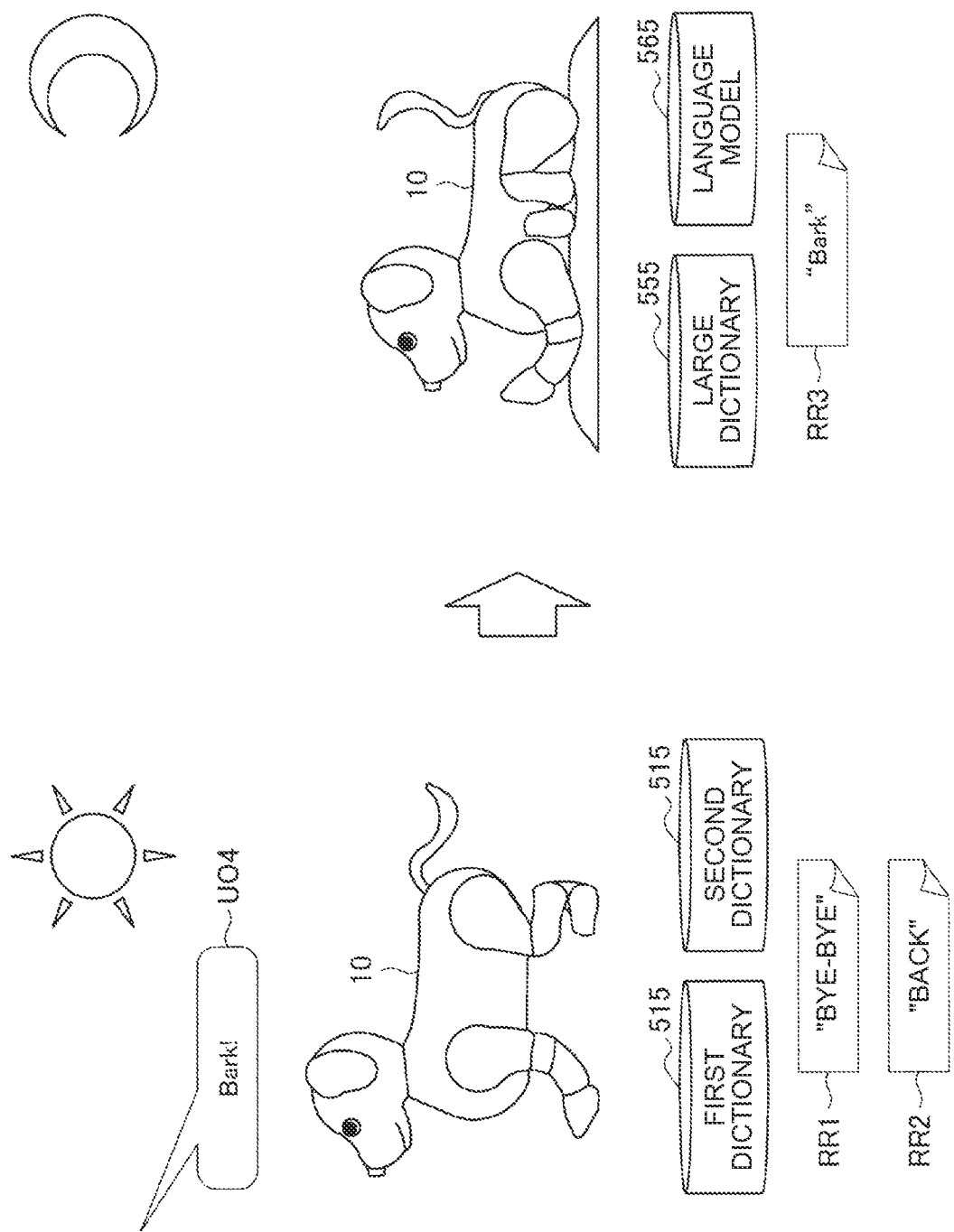
FIG. 21 is a diagram illustrating an example of re-evaluation of usage performance of utterance based on a result of the third voice recognition process according to the embodiment.

FIG. 21 is a diagram illustrating an example of re-evaluation of the usage performance of utterance based on the result of the third voice recognition process according to an embodiment of the present disclosure. In an exemplary case illustrated in FIG. 21, first, as illustrated on the left side of the figure, the first voice processing using the first dictionary 715 and the second voice recognition process using the second dictionary 745 are executed in real time for a user's utterance UO4, and the result RR1 of the first voice recognition process and the result RR2 of the second voice recognition process are acquired.

On the other hand, the third voice recognition unit 760 according to an embodiment of the present disclosure can execute the third voice recognition process using the large dictionary 755 that registers a large number of various utterance expressions and using a plurality of language models 765 during a time zone in which the usage rate of computational resources is predicted to be less than a threshold, for example, during charging time at midnight, making it possible to achieve the voice recognition with an extremely high accuracy without causing a burden on other operations of the autonomous operating body 10.

Furthermore, the evaluation unit 735 according to an embodiment of the present disclosure can perform re-evaluation of the utterance expressions related to the result RR1 of the first voice recognition and the result RR2 of the second voice recognition process acquired in real time based on a highly accurate result RR34 of the third voice recognition process.

For example, in an exemplary case illustrated in FIG. 21, the evaluation unit 735 may determine that an utterance expression "Bye-bye" and an utterance expression "Back" as the result RR1 of the first voice recognition process and the result RR2 of the second voice recognition process are erroneous recognitions based on the fact that a result RR3 of the third voice recognition process is "Bark".

In this manner, with the third voice recognition process according to an embodiment of the present disclosure, eliminating the impact of erroneous recognition and false-positive recognition and giving high evaluation to the utterance expression having a remarkably high probability of being actually uttered by the user will make it possible to preferentially add utterance expressions corresponding to the actual usage performance of utterance, to the first dictionary.

Next, the dynamic change of the maximum number to be registered as utterance expressions according to an embodiment of the present disclosure will be described. The above description has described an exemplary case in which the utterance expressions registered in the first dictionary 715 are limited, and the number of utterance expressions registered in the second dictionary 745 is also limited in the case where the second voice recognition unit 750 is provided, and the utterance expressions are dynamically updated in accordance with the usage performance of utterance, thereby achieving both reduction of computation amount and improvement of voice recognition accuracy.

On the other hand, it is conceivable that the number of utterance expressions used by the user might change depending on user's situation or the like. Therefore, the dictionary update unit 740 according to an embodiment of the present disclosure may have a function of dynamically changing the maximum number of utterance expressions that can be registered in the first dictionary 715 or the like based on the user's situation.

FIG. 22 is a diagram illustrating a dynamic change in the maximum number of registered utterance expressions according to an embodiment of the present disclosure. For example, the left side figure of FIG. 22 illustrates an example in which a user U1 is still a child at the start of using the autonomous operating body 10.

At this time, it is predicted that the dictionary update unit 740 according to an embodiment of the present disclosure uses relatively few utterance expressions used by the user U1. Therefore, the maximum number of utterance expressions that can be registered in the first dictionary 715 may be set to 1000.

In contrast, when the user U1 grows up over time, the number of utterance expressions used by the user U1 is expected to increase. Therefore, as illustrated in the center of the figure, the dictionary update unit 740 according to an embodiment of the present disclosure may change the maximum number of utterance expressions that can be registered in the first dictionary 715 to the number 2000 in accordance with the growth of the user U1.

Furthermore, for example, it is expected that the number of users of the autonomous operating body 10 will increase over time, such as when the user U1 gets married. Therefore, the dictionary update unit 740 according to an embodiment of the present disclosure may change, as necessary, the maximum number of utterance expressions that can be registered in the first dictionary 715 together with the increase or decrease of the number of users as described above. In an exemplary case illustrated in FIG. 22, the dictionary update unit 740 changes the maximum number of utterance expressions that can be registered in the first dictionary 715 to the number 3000 based on the new addition of the user U2.

In this manner, the dictionary update unit 740 according to an embodiment of the present disclosure can dynamically change the maximum number of utterance expressions that can be registered to the first dictionary 715 based on the growth of users, the increase/decrease of the number of users, or the like. With the use of the above-described function of the dictionary update unit 740 according to an embodiment of the present disclosure, it is possible to register the number of utterance expressions that follows the change in the user's situation to the first dictionary 715, leading to achievement of voice recognition of sufficient and non-excessive levels.

Hereinabove, the evaluation of the usage performance of utterance according to an embodiment of the present disclosure and the update of the dictionary based on the evaluation have been described. The autonomous operating body 10 and the information processing server 20 according to an embodiment of the present disclosure is capable of executing various operations and processes based on the user's utterance recognized as described above.

For example, the information processing server 20 according to an embodiment of the present disclosure may have a function of notifying a terminal such as a smartphone possessed by the user of a notification related to an utterance recognized by the autonomous operating body 10, or the like. At this time, the information processing server 20 may present the utterance expression recognized by the autonomous operating body 10 to the user, for example, via an application installed on the terminal.

For example, in a case where the autonomous operating body 10 recognizes the utterance expression "apple", the information processing server 20 may present "apple" as a recent favorite word and may notify the user of a message such as "Do you like apples?" According to this function, it is possible to demonstrate to the user that the autonomous operating body 10 properly grasps the user's utterance.

Furthermore, various utterance expressions recognized by the autonomous operating body 10 according to an embodiment of the present disclosure may be used for feedback to the character and behavior of the autonomous operating body 10. For example, there is a case where the user praises the autonomous operating body 10 using a dialect. In this case, by additionally registering the scolding expression of the same dialect to the first dictionary 715, the autonomous operating body 10 can respond correctly to the dialect in a case where the user scolds the autonomous operating body 10 using the dialect thereafter.

Furthermore, the recognized utterance expression may be used as a trigger for executing a predetermined function. For example, in a case where a predetermined trending expression becomes popular in a certain sport and the trending expression registered in the first dictionary 715 is recognized, the autonomous operating body 10 can take an action that can remind the user of the sport.

Furthermore, the autonomous operating body 10 according to an embodiment of the present disclosure may entertain the user by performing an output imitating the recognized utterance expression.

Furthermore, the autonomous operating body 10 may cooperate with an external device or service. For example, when the recognized utterance expression is "Help", the autonomous operating body 10 may control the autonomous operating body 10 to send a message to a family member or the like. Furthermore, for example, when the recognized utterance expression is "Tell me the weather", the autonomous operating body 10 may inquire the weather information from an external service. Furthermore, the autonomous operating body 10 can make a registration to an SNS or the like based on the recognized user's instruction, for example.

Furthermore, in a case where the autonomous operating body 10 according to an embodiment of the present disclosure recognizes the utterance "This is an apple" when the camera 520 is imaging an object, it is possible to perform learning using the image of the object and the utterance expression "apple" in association with each other.

An example of the operation and the process based on the recognition result has been described as above. In this manner, the autonomous operating body 10 according to an embodiment of the present disclosure can execute various actions and processes based on the recognized utterance expression.

Furthermore, the autonomous operating body 10 according to an embodiment of the present disclosure can execute various modification processes other than those described above. For example, the autonomous operating body 10 may dynamically change the evaluation criteria related to dictionary update based on the number of times of recognition and the level of confidence of the utterance expression. By appropriately changing the degree of confidence or the importance level of the number of recognition times, the autonomous operating body 10 can switch evaluation modes such as rejection-oriented type, balance type, and recognition rate-oriented type.

Furthermore, the above description is an exemplary case where the second dictionary 745 according to an embodiment of the present disclosure is provided in the autonomous operating body 10. However, the second dictionary 745 according to an embodiment of the present disclosure may be provided in a device installed on the cloud such as the information processing server 20.

At this time, the autonomous operating body 10 according to an embodiment of the present disclosure can perform an action plan and an operation based on the result of the first voice recognition process on the local side and the result of the second voice recognition process on the cloud side. In a case where a frequently recognized utterance expression has been detected by the second voice recognition process on the cloud side, the utterance expression will be transferred to the first dictionary 715 on the local side so as to achieve higher response.

Furthermore, the above description is an exemplary case where the evaluation of the usage performance of utterance according to an embodiment of the present disclosure is performed at intervals of about one week to one month. Alternatively, the evaluation of the usage performance of utterance and the dictionary update according to an embodiment of the present disclosure may be performed at intervals using a combination of weekly, monthly, semi-annual, or the like. With this intervals, the high-sensitivity evaluation achieved by weekly processing can be rounded by the semi-annual evaluation, for example.

Furthermore, in the initial state, the autonomous operating body 10 according to an embodiment of the present disclosure may perform, in the initial state, automated voice recognition process using a plurality of language models such as Japanese, English, and Chinese without specifying a language model. At this time, in a case where the recognized utterance expressions are made in Japanese with high proportion, the autonomous operating body 10 may register more Japanese utterance expressions in the first dictionary 715 and may gradually delete English or Chinese utterance expressions from the first dictionary 715. With such a function, the user can use the voice recognition function in the initial setting without specifying the language to be used.

Furthermore, the above description has mainly described an exemplary case where the evaluation unit 735 evaluates the usage performance of utterance based on the number of times of recognition or the like. However, the evaluation unit 735 according to an embodiment of the present disclosure does not necessarily have to use the number of times of recognition as an index for evaluation. For example, when focusing on individuals, utterance expressions such as "Birthday" and "Nice to meet you" are an example of the important utterance expressions to be recognized even though the utterance expressions are not supposed to be used throughout the year.

Therefore, the first dictionary 715 according to an embodiment of the present disclosure may contain fixed expressions that is regularly registered independent of the evaluation based on the number of times of recognition or the like. On the other hand, in a case where the evaluation unit 735 evaluates based on collective intelligence, the number of times of recognition of the above "Birthday" and "Nice to meet you" is predicted to be averaged regardless of the time of the year. Therefore, those expressions are assumed to be continuously registered in the first dictionary 715 even after execution of the evaluation based on the number of times of recognition.

3. Summary

As described above, the autonomous operating body 10 according to an embodiment of the present disclosure includes: the first dictionary 715 that has registered a plurality of utterance expressions; the first voice recognition unit 710 that executes the first voice recognition process using the first dictionary 715; and the dictionary update unit 740 that updates utterance expressions to be registered in the first dictionary 715 based on the usage performance of utterance of the user. In addition, the dictionary update unit 740 according to an embodiment of the present disclosure is characterized by deleting utterance expressions having a low usage performance of utterance from the first dictionary 715, or by transferring to the second dictionary 745 that has registered a plurality of utterance expressions not registered in the first dictionary 715. According to this configuration, it is possible to improve the voice recognition accuracy while suppressing the computation amount.

The preferred embodiments of the present disclosure have been described in detail above with reference to the accompanying drawings, but the technical scope of the present disclosure is not limited to such examples. It is obvious that a person having ordinary knowledge in the technical field of the present disclosure can come up with various alterations or modifications within the scope of the technical idea described in the claims, and these are understood, of course, to belong to the technical scope of the present disclosure.

Furthermore, the effects described in the present specification are merely illustrative or exemplary and are not limited. That is, the technique according to the present disclosure can exhibit other effects that are apparent to those skilled in the art from the description of the present specification in addition to or instead of the above effects.

It is also possible to create a program for the hardware such as CPU, ROM, and RAM built in a computer to exert the functions equivalent to the configuration of the information processing apparatus actualized by the autonomous operating body 10 or the like, and a computer-readable recording medium that has recorded the program can also be provided.

Note that the following configurations also belong to the technical scope of the present disclosure.

(1) An information processing apparatus comprising:
a first dictionary that has registered a plurality of utterance expressions;
a first voice recognition unit that executes a first voice recognition process using the first dictionary; and
a dictionary update unit that updates utterance expressions to be registered to the first dictionary based on usage performance of utterance of a user,
wherein the dictionary update unit deletes an utterance expression having a low usage performance of utterance from the first dictionary or transfers the utterance expression to a second dictionary that has registered a plurality of utterance expressions not registered in the first dictionary.

(2) The information processing apparatus according to (1), wherein the dictionary update unit transfers an utterance expression registered in the second dictionary to the first dictionary based on a priority of the utterance expression registered in the second dictionary.

(3) The information processing apparatus according to (1) or (2), further comprising
the second dictionary.

(4) The information processing apparatus according to (3),
wherein the dictionary update unit additionally registers an utterance expression acquired from an external device to the first dictionary or the second dictionary.

(5) The information processing apparatus according to (4),
wherein the dictionary update unit acquires, from the external device, a correlative expression analyzed based on collective intelligence of the external device, and
the collective intelligence is a set of the usage performance of utterance collected from a plurality of terminals.

(6) The information processing apparatus according to any of (3) to (5), further comprising
a second voice recognition unit that executes a second voice recognition process using the second dictionary,
wherein the first voice recognition unit and the second voice recognition unit respectively execute the first voice recognition process and the second voice recognition process on an identical utterance that has been detected.

(7) The information processing apparatus according to (6),
wherein the first voice recognition unit and the second voice recognition unit respectively perform real-time execution of the first voice recognition process and the second voice recognition process.

(8) The information processing apparatus according to (6), further comprising
an action planning unit that plans an action of an autonomous operating body based on a result of the first voice recognition process,
wherein, based on a result of the second voice recognition process, the action planning unit corrects an action plan formulated based on the result of the first voice recognition process.

(9) The information processing apparatus according to any of (1) to (8), further comprising
an evaluation unit that evaluates the usage performance of utterance,
wherein the evaluation unit evaluates the usage performance of utterance based on the number of utterance expressions recognized by the first voice recognition process and an utterance status acquired at the time of user's utterance.

(10) The information processing apparatus according to (9),
wherein the evaluation unit evaluates the usage performance of utterance further based on a result of the second voice recognition process using the second dictionary.

(11) The information processing apparatus according to (9) or (10),
wherein the evaluation unit evaluates the usage performance of utterance based on a result of the first voice recognition process and based on a level of sureness calculated from the utterance status.

(12) The information processing apparatus according to any of (9) to (11), further comprising
a third voice recognition unit that executes a third voice recognition process using a large dictionary that has registered a larger number of utterance expressions compared with the first dictionary and the second dictionary,
wherein the evaluation unit evaluates the usage performance of utterance based on a result of the third voice recognition process.

(13) The information processing apparatus according to (12),
wherein the third voice recognition unit executes the third voice recognition process during a time zone in which a usage rate of computational resources is predicted to be less than a threshold.
(14) The information processing apparatus according to (12) or (13),
wherein the third voice recognition unit executes the third voice recognition process using a language model different from a model used by the first voice recognition unit.
(15) The information processing apparatus according to any of (1) to (14),
wherein the dictionary update unit dynamically changes a maximum number of utterance expressions that can be registered to the first dictionary, based on user's situation.
(16) The information processing apparatus according to (15),
wherein the dictionary update unit dynamically changes the maximum number of utterance expressions that can be registered to the first dictionary, based on at least one of increase/decrease of the number of users or growth of the user.
(17) The information processing apparatus according to any of (1) to (16),
wherein the utterance expression includes at least vocabulary.
(18) The information processing apparatus according to (8), wherein the apparatus is provided as the autonomous operating body.
(19) An information processing method, by a processor, comprising:
executing a first voice recognition process using a first dictionary that has registered a plurality of utterance expressions; and
updating utterance expressions to be registered to the first dictionary based on a usage performance of utterance of a user,
wherein the updating further includes: deleting an utterance expression having a low usage performance of utterance from the first dictionary; or transferring the utterance expression to a second dictionary that has registered a plurality of utterance expressions not registered in the first dictionary.
(20) A program causing a computer to function as an information processing apparatus including:
a first dictionary that has registered a plurality of utterance expressions;
a first voice recognition unit that executes a first voice recognition process using the first dictionary; and
a dictionary update unit that updates utterance expressions to be registered to the first dictionary based on usage performance of utterance of a user,
wherein the dictionary update unit deletes an utterance expression having a low usage performance of utterance from the first dictionary or transfers the utterance expression to a second dictionary that has registered a plurality of utterance expressions not registered in the first dictionary.

REFERENCE SIGNS LIST

10 AUTONOMOUS OPERATING BODY
110 INPUT UNIT
120 RECOGNITION UNIT
130 LEARNING UNIT
140 ACTION PLANNING UNIT
150 OPERATION CONTROL UNIT
160 DRIVE UNIT
170 OUTPUT UNIT
710 FIRST VOICE RECOGNITION UNIT
715 FIRST DICTIONARY
720 UTTERANCE LOG
725 STATE RECOGNITION UNIT
730 UTTERANCE STATUS LOG
735 EVALUATION UNIT
740 DICTIONARY UPDATE UNIT
745 SECOND DICTIONARY
750 SECOND VOICE RECOGNITION UNIT
755 LARGE DICTIONARY
760 THIRD VOICE RECOGNITION UNIT
765 LANGUAGE MODEL

The invention claimed is:

1. An information processing apparatus, comprising:
a first dictionary configured to register a first plurality of utterance expressions, wherein the first plurality of utterance expressions is frequently used by a user;
a second dictionary configured to register a second plurality of utterance expressions lesser than the first plurality of utterance expressions, wherein the first plurality of utterance expressions is different from the second plurality of utterance expressions; and
a processor configured to:
execute a voice recognition process based on the first dictionary and the second dictionary, wherein the execution of the voice recognition process based on the second dictionary is subsequent to the execution of the voice recognition process based on the first dictionary; and
update the first plurality of utterance expressions registered in the first dictionary based on usage performance of utterance of the user, wherein
the updating of the first plurality of utterance expressions includes deletion of a first utterance expression having a low usage performance of utterance from the first dictionary and transfer of the first utterance expression to the second dictionary.

2. The information processing apparatus according to claim 1, wherein the processor is further configured to transfer a second utterance expression of the second plurality of utterance expressions registered in the second dictionary to the first dictionary based on a priority of the second utterance expression registered in the second dictionary.

3. The information processing apparatus according to claim 1, wherein the processor is further configured to evaluate the usage performance of utterance based on a number of utterance expressions recognized by the voice recognition process and an utterance status acquired at a time of user utterance.

4. The information processing apparatus according to claim 3, wherein the processor is further configured to evaluate the usage performance of utterance based on a result of the voice recognition process using the second dictionary.

5. The information processing apparatus according to claim 3, wherein the processor is further configured to evaluate the usage performance of utterance based on a result of the voice recognition process and a level of sureness calculated from the utterance status.

6. The information processing apparatus according to claim 3, wherein the processor is further configured to:
execute a specific voice recognition process based on a large dictionary that has registered a larger number of utterance expressions compared with the first dictionary and the second dictionary,
evaluate the usage performance of utterance based on a result of the specific voice recognition process.

7. The information processing apparatus according to claim 6, wherein the processor is further configured to execute the specific voice recognition process during a time zone in which a usage rate of computational resources is predicted to be less than a threshold.

8. The information processing apparatus according to claim 6, wherein the processor is further configured to execute the specific voice recognition process based on a language model different from a voice recognition unit model.

9. The information processing apparatus according to claim 1, wherein the processor is further configured to dynamically change a maximum number of utterance expressions in the first plurality of utterance expressions registered to the first dictionary, based on a user situation.

10. The information processing apparatus according to claim 9, wherein the processor is further configured to dynamically change the maximum number of utterance expressions in the first plurality of utterance expressions registered to the first dictionary, based on at least one of increase or decrease of a number of users or growth of the user.

11. The information processing apparatus according to claim 1, wherein the first plurality of utterance expressions includes at least vocabulary.

12. The information processing apparatus according to claim 1, wherein the processor is further configured to register a second utterance expression acquired from an external device to one of the first dictionary or the second dictionary.

13. The information processing apparatus according to claim 12, wherein
the processor is further configured to acquire, from the external device, a correlative expression analyzed based on collective intelligence of the external device, and
the collective intelligence is a set of the usage performance of utterance collected from a plurality of terminals.

14. The information processing apparatus according to claim 1, wherein the processor is further configured to perform real-time execution of the voice recognition process.

15. The information processing apparatus according to claim 1, wherein the processor is further to configured to:
plan an action of an autonomous operating body based on a first result of the voice recognition process; and
based on a second result of the voice recognition process, correct the action plan.

16. The information processing apparatus according to claim 15, wherein the information processing apparatus is the autonomous operating body.

17. An information processing method, by a processor, comprising:
executing a voice recognition process based on a first dictionary and a second dictionary, wherein
the first dictionary has registered a first plurality of utterance expressions,
the first plurality of utterance expressions is frequently used by a user,
the second dictionary registers a second plurality of utterance expressions lesser than the first plurality of utterance expressions,
the first plurality of utterance expressions is different from the second plurality of utterance expressions, and
the execution of the voice recognition process based on the second dictionary is subsequent to the execution of the voice recognition process based on the first dictionary; and
updating the first plurality of utterance expressions registered in the first dictionary based on a usage performance of utterance of the user, wherein
the updating of the first plurality of utterance expressions includes deleting an utterance expression having a low usage performance of utterance from the first dictionary and transferring the utterance expression to the second dictionary.

18. A non-transitory computer-readable medium having stored thereon computer-executable instructions, which when executed by a computer, cause the computer to execute operations, the operations comprising:
executing a voice recognition process based on a first dictionary and a second dictionary, wherein
the first dictionary has registered a first plurality of utterance expressions,
the first plurality of utterance expressions is frequently used by a user,
the second dictionary registers a second plurality of utterance expressions lesser than the first plurality of utterance expressions,
the first plurality of utterance expressions is different from the second plurality of utterance expressions, and
the execution of the voice recognition process based on the second dictionary is subsequent to the execution of the voice recognition process based on the first dictionary; and
updating the first plurality of utterance expressions registered in the first dictionary based on usage performance of utterance of the user, wherein
the updating of the first plurality of utterance expressions includes deleting an utterance expression having a low usage performance of utterance from the first dictionary and transferring the utterance expression to the second dictionary.

* * * * *